(12) United States Patent
Sengupta et al.

(10) Patent No.: US 9,053,131 B2
(45) Date of Patent: * Jun. 9, 2015

(54) BACKUP OF DATA ACROSS NETWORK OF DEVICES

(71) Applicant: Accenture Global Services Limited, Dublin (IE)

(72) Inventors: Shubhashis Sengupta, Bangalore (IN); Annervaz Karukapadath Mohamedrasheed, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,439

(22) Filed: Dec. 10, 2013

(65) Prior Publication Data

US 2014/0101111 A1    Apr. 10, 2014

Related U.S. Application Data

(63) Continuation of application No. 13/300,203, filed on Nov. 18, 2011, now Pat. No. 8,630,983.

(30) Foreign Application Priority Data

Aug. 27, 2011    (IN) .......................... 2937/CHE/2011

(51) Int. Cl.
*G06F 17/30* (2006.01)
*G06F 11/20* (2006.01)
*G06F 11/14* (2006.01)

(52) U.S. Cl.
CPC ...... *G06F 17/30289* (2013.01); *G06F 11/1446* (2013.01); *G06F 11/2094* (2013.01)

(58) Field of Classification Search
CPC ............ G06F 11/1464; G06F 11/1469; G06F 11/1451; G06F 11/1458; G06F 3/0614; G06F 3/0647; G06F 17/30194; G06F 21/604; G06F 2221/2103; G06F 2221/2107; G06F 2221/2115; G06F 2221/2143; G06F 17/30289; G06F 11/14
USPC .......................................................... 707/654
See application file for complete search history.

(56) References Cited

U.S. PATENT DOCUMENTS 5,819,020 A *  10/1998  Beeler, Jr. .................... 714/5.11
6,092,085 A *   7/2000  Keene .................................. 1/1
6,865,655 B1 *  3/2005  Andersen ...................... 711/162
7,069,402 B2 *  6/2006  Coulter et al. ................ 711/162

(Continued)

OTHER PUBLICATIONS

Lin, W.K., et al., Erasure Code Replication Revisited, 2004, pp. 1-8, IEEE.

(Continued)

*Primary Examiner* — Sheree Brown
(74) *Attorney, Agent, or Firm* — Brinks Gilson & Lione

(57) ABSTRACT

A distribution plan that indicates how to encode and distribute backup data across multiple data centers may be generated. The distribution plan may be generated such that one or more characteristics of the distribution plan, such as costs, are optimized while constraints on the plan, such as protection level, recovery point objective (RPO), and recovery time objective (RTO) are satisfied. The protection level may indicate the number of the data centers that are to remain available such that the backup data is recoverable from encoded fragments of the backup data stored in the data centers that remain available.

19 Claims, 4 Drawing Sheets

(56) References Cited

U.S. PATENT DOCUMENTS

| | | | |
|---|---|---|---|
| 7,392,423 B2* | 6/2008 | Henrickson | 714/4.11 |
| 7,634,685 B2* | 12/2009 | Henrickson | 714/6.11 |
| 8,224,784 B2* | 7/2012 | Henrickson | 707/654 |
| 2001/0056438 A1* | 12/2001 | Ito | 707/204 |
| 2006/0036658 A1* | 2/2006 | Henrickson | 707/204 |
| 2006/0036890 A1* | 2/2006 | Henrickson | 714/2 |
| 2006/0036895 A1* | 2/2006 | Henrickson | 714/4 |
| 2006/0183469 A1* | 8/2006 | Gadson | 455/419 |
| 2010/0037056 A1* | 2/2010 | Follis et al. | 713/171 |
| 2013/0054536 A1 | 2/2013 | Sengupta et al. | |

OTHER PUBLICATIONS

Lwin, T.T., et al., High Availability Cluster System for Local Disaster Recovery with Markov Modeling Approach, 2009, vol. 6, No. 2, pp. 1-8, IJCSI International Journal of Computer Science Issues.

Chang, Fay et al., Myriad: Cost-Effective Disaster Tolerance, downloaded Mar. 25, 2011, pp. 1-13, Compaq Systems Research Center, Palo Alto, CA.

Litwin, Witold et al., LH*$_{RS}$: A High-Availability Scalable Distributed Data Structure Using Reed Solomon Codes, 2000, pp. 237-248, ACM, Dallas, TX.

Wang, Yanlong et al., A Fast Disaster Recovery Mechanism for Volume Replication Systems, 2007, pp. 732-743, Springer-Verlag Berlin Heidelberg.

Collins, Rebecca L., et al., Assessing the Performance of Erasure Codes in the Wide-Area, 2005, pp. 1-6, IEEE.

Xin, Qin et al., Evaluation of Distributed Recovery in Large-Scale Storage Systems, downloaded Jul. 7, 2009, pp. 1-10.

Li, Mingqiang et al., GRID Codes: Strip-Based Erasure Codes with High Fault Tolerance for Storage Systems, Jan. 2009, vol. 4, No. 4, Article 15, pp. 1-22, ACM Transactions on Storage.

Kubiatowicz, John et al., OceanStore: An Architecture for Global-Scale Persistent Storage, 2000, pp. 1-12, ACM, Cambridge, Massachusetts.

Wah, Benjamin W., An Efficient Heuristic for File Placement on Distributed Databases, 1980, pp. 462-468, IEEE.

Lillibridge, Mark et al., A Cooperative Internet Backup Scheme, downloaded Mar. 31, 2009, pp. 1-13, HP Systems Research Center, Palo Alto, CA.

Stoica, Ion, et al., Chord: A Scalable Peer-to-Peer Lookup Service for Internet Applications, 2001, pp. 1-12, ACM, San Diego, CA.

Colarelli, Dennis, et al., The Case for Massive Arrays of Idle Disks (MAID), Jan. 7, 2002, pp. 1-6, Dept. of Computer Science, Univ. of Colorado, Boulder.

Karger, David et al., Consistent Hashing and Random Trees: Distributed Caching Protocols for Relieving Hot Spots on the World Wide Web, downloaded May 6, 2010, pp. 1-10.

Weatherspoon, Hakim et al., Erasure Coding vs. Replication: A Quantitative Comparison, downloaded Feb. 9, 2009, pp. 1-11.

Adya, Atul et al., FARSITE: Federated, Available, and Reliable Storage for an Incompletely Trusted Environment, Dec. 2002, pp. 1-14, 5th Symposium on Operating Systems Design and Implementation, Boston, MA.

Plank, James et al., A Performance Evaluation and Examination of Open-Source Erasure Coding Libraries for Storage, Feb. 2009, pp. 1-14, FAST-09: 7th USENIX Conference on File and Storage Technologies, San Francisco, CA.

Honicky, R.J., et al., Replication Under Scalable Hashing: A Family of Algorithms for Scalable Decentralized Data Distribution, Apr. 2004, pp. 1-10, Proceedings of the 18th International Parallel and Distributed Processing Symposium, Santa Fe, NM.

Couture, Adam W., et al., Online Server Backup Services Vie for SMBs and Remote Servers, 2Q07 Update, Jun. 2007, pp. 1-14, Gartner, Inc.

Online Backup Services, The Market Place, downloaded Oct. 5, 2011, pp. 1-11, available at www.ibackup.com/Online-backup-whitepaper.pdf.

Alvarez, Guillermo A., et al., Minerva: An Automated Resource Provisioning Tool for Large-Scale Storage Systems, Nov. 2001, pp. 483-518, vol. 19, No. 4, ACM Transactions on Computer Systems.

Rowstron, Antony, et al., Pastry: Scalable, Decentralized Object Location and Routing for Large-Scale Peer-to-Peer Systems, Nov. 2001, pp. 1-22, Proc. of the 18th IFIP/ACM International Conference on Distributed Systems Platforms, Heidelberg, Germany.

Gopisetty, S., et al., Automated Planners for Storage Provisioning and Disaster Recovery, Jul./Sep. 2008, vol. 52, No. 4/5, pp. 1-13, International Business Machines Corporation.

Fleischer, Rudolf et al., New Results for Online Page Replication, Sep. 14, 2003, pp. 1-40, Elsevier Science.

Clarke, Ian, A Distributed Decentralised Information Storage and Retrieval System, 1999, pp. 1-45, Division of Informatics, University of Edinburgh.

Bell, William H., et al., Evaluation of an Economy-Based File Replication Strategy for a Data Grid, downloaded Nov. 15, 2011, pp. 1-8.

Ranganathan, Kavitha et al., Decoupling Computation and Data Scheduling in Distributed Data-Intensive Applications, downloaded Nov. 15, 2011, pp. 1-7, available at www.globus.org/alliance/publications/papers/decouple.pdf.

Grapa, Enrique et al., Some Theorems to Aid in Solving the File Allocation Problem, Nov. 1977, vol. 20. No. 11, pp. 878-882, Communications of the ACM.

Atmos Cloud Storage, downloaded Aug. 29, 2011, pp. 1-2, available at http://www.emc.com.

Erasure Code, downloaded Aug. 1, 2011, pp. 1-5, available at http://en.wikipedia.org/wiki/Erasure_code.

Linear Programming, downloaded Jul. 31, 2011, pp. 1-19, available at http://en.wikipedia.org/wiki/Linear_programming.

Gopisetty, S. et al., Evolution of Storage Management: Transforming Raw Data Into Information, Jul./Sep. 2008, vol. 52, No. 4/5, pp. 1-12, International Business Machines Corporation.

SAN Storage Provisioning Planner, Aug. 30, 2007, pp. 1-16, International Business Machines Corporation.

Chen, Zheng et al., Exploring Fault-tolerant Distributed Storage System Using GE Code, 2008, pp. 1-8, IEEE.

Litwin, Witold et al., LH*—A Scalable, Distributed Data Structure, Dec. 1996, pp. 1-46, vol. 21, No. 4, ACM Transactions on Database Systems.

Honicky, R.J. et al., RUSH: Balanced, Decentralized Distribution for Replicated Data in Scalable Storage Clusters, downloaded downloaded Nov. 21, 2011, pp. 1-12, Storage Systems Research Center, University of California, Santa Cruz, CA.

Castro, Miguel et al., Secure Routing for Structured Peer-to-Peer Overlay Networks, Dec. 2002, pp. 1-16, Proc. of the 5th Usenix Symposium on Operating System Design and Implementation, Boston, MA.

Plank, James S., T1: Erasure Codes for Storage Applications, Dec. 13-16, 2005, pp. 1-74, 4th Usenix Conference on File and Storage Technologies, San Francisco, CA.

U.S. Office Action dated Apr. 29, 2013, pp. 1-12, U.S. Appl. No. 13/300,203, U.S. Patent and Trademark Office.

* cited by examiner

BACKUP OF DATA ACROSS NETWORK OF DEVICES

This application is a continuation application of, and claims priority under 35 U.S.C. §120 to, U.S. application Ser. No. 13/300,203, "BACKUP OF DATA ACROSS NETWORK OF DEVICES" filed Nov. 18, 2011, the entire contents of which are incorporated by reference, which claims priority under 35 U.S.C. §119 to Indian Patent Application No. 2937/CHE/2011, filed Aug. 27, 2011, the entire contents of which are hereby incorporated herein by reference.

BACKGROUND

1. Technical Field

This application relates to data backups and, in particular, to planning placement of backup data.

2. Related Art

Online Disaster Recovery (DR) service providers or other storage service providers may host backup data on behalf of clients of the service providers. As a result, if a client's site or sites fail, then the client may recover the data from the backup data hosted by the service provider. Alternatively or in addition, the service provider may recover the data on behalf of the client.

A corporate enterprise may have a large volume of critical data. A corporate Information Technology team in the enterprise may run data centres at multiple geographic locations with the critical data replicated to each of the data centres.

SUMMARY

A system may be provided that generates a distribution plan to distribute backup data across multiple data centres. The system may include a parameter component and a constraint satisfaction component. The parameter component may receive a protection level parameter that indicates the number of the data centres that may fail and still be able to recover the backup data from encoded fragments of the backup data stored in the data centres that did not fail. The constraint satisfaction component may generate a distribution plan that satisfies a set of constraints including the protection level parameter. The distribution plan may include the number of the encoded fragments to distribute to each respective one of the data centres.

A method may be provided that generates a distribution plan for distributing backup data over multiple data centres. A set of constraints on the distribution plan may be provided that includes a protection level. The protection level may indicate that if a particular number of the data centres fail, then the backup data is recoverable from encoded fragments of the backup data stored on the data centres that did not fail. The number of the encoded fragments and the amount of data in the encoded fragments to distribute to each respective one of the data centres may be determined such that the set of constraints including the protection level is satisfied. The distribution plan may indicate the number of the encoded fragments to distribute to each respective one of the data centres. The distribution plan may also indicate, for example, the total volume of encoded data to be distributed to each respective one of the data centres and/or to all of the data centres.

An apparatus may be provided for generating a distribution plan that indicates how to distribute backup data across multiple data centres. The apparatus may include a parameter component and a constraint satisfaction component. The parameter component may receive a protection level parameter that indicates the number of the data centres that are to remain available such that the backup data is recoverable from encoded fragments of the backup data stored in the data centres that remain available. The constraint satisfaction component may determine how many of the encoded fragments to distribute to each respective one of the data centres such that a set of constraints are satisfied, where a constraint is that if the number of the data centres indicated in the protection level parameter remain available, then the backup data is recoverable from the encoded fragments of the backup data that are stored in the data centres that remain available.

An interesting feature may be that constraints such as costs, recovery point objective (RPO), and/or recovery time objective (RTO), may also be included in the set of constraints. Further objects and advantages of the present disclosure will be apparent from the following description, reference being made to the accompanying drawings.

BRIEF DESCRIPTION OF THE DRAWINGS

The embodiments may be better understood with reference to the following drawings and description. The components in the figures are not necessarily to scale, emphasis instead being placed upon illustrating the principles of the disclosure. Moreover, in the figures, like-referenced numerals designate corresponding parts throughout the different views.

DETAILED DESCRIPTION

By way of illustrative example, a data placement planner may provide a way of backing up business data onto data centres (DCs) located across multiple geographic locations. In particular, the data placement planner may generate a plan for distributing backup data across a potentially large number of data centres so that, for example, (i) the client data is recoverable in the event of catastrophic failure at one or more data centres, and, (ii) the client data may be distributed in a way taking into consideration business criteria, such as cost of storage and network traffic, protection level against site failures, and other business and/or operational constraints like recovery point objective (RPO), and recovery time objective (RTO). The data placement planner may fit the constraints into a linear programming model and solve for a solution that represents a distribution plan using an erasure coding scheme.

In a first example scenario, an online Disaster Recovery (DR) service provider may host backup data from clients so that the DR service provider may recover the data if a client's site or sites fail. Such a provider may operate data centres across several geographic locations, and may plan to replicate portions of the backup data across the locations in order to provide fault isolation. In a second example scenario, a large multi-national enterprise may operate on a large volume of data. A corporate Information Technology team in the enterprise may plan to backup the data to data centres at multiple geographic locations in order to provide business continuity if disaster strikes one or more locations. In both the first or second example scenarios, the data placement planner may help provide a data distribution plan.

One feature of the systems and methods described below is that an distribution plan may be analytically determined given a set of constraints instead of having to guess what the distribution plan may be. Another feature of the systems and methods described below is that erasure coding provides a smaller data footprint than a plain replication mechanism. Still another feature of the systems and methods described below is that a distribution plan for multiple customers may be determined even though constraints vary by customer.

Figure 1:
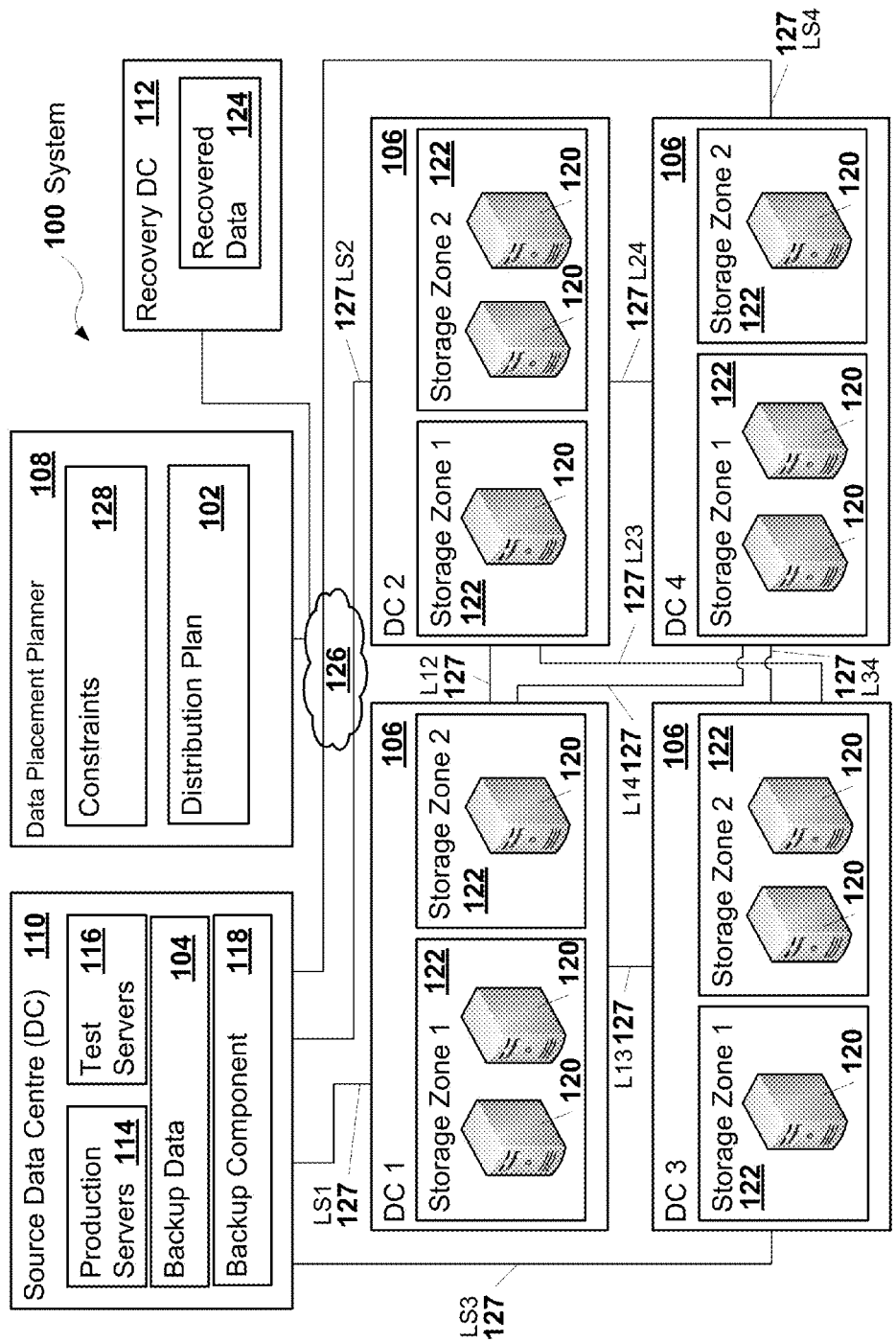
FIG. 1 illustrates an example system for generating a distribution plan for distributing backup data across multiple data centres.

FIG. 1 illustrates a system 100 for generating a distribution plan 102 for distribution of backup data 104 across data centres 106. The system 100 may include a data placement planner (DPP) 108, a primary site or a source data centre 110, the data centres 106, and a recovery site or recovery data centre 112.

The backup data 104 may include any information that is to be backed up. The backup data 104 may include one or more files. Examples of the backup data 104 may include operational data, business data, engineering data, database files, software application images, computer source code, executable binaries, or any other type of data.

The source data centre 110 may be one or more physical sites that each contains one or more devices. Alternatively or in addition, the source data centre 110 may be a logical collection of one or more devices. In particular, the source data centre 110 may include one or more devices that generate the backup data 104. Alternatively or in addition, the source data centre 110 may include one or more devices that operate as a source from which the backup data 104 may be generated. The source data centre 110 may include one or more devices, such as, for example, production servers 114, test servers 116, or a combination thereof. Examples of a device that is included in the source data centre 110 may include an application server, a web server, a database server, a rack server, a laptop, a desktop computing device, a cell phone, or any other computing device that stores or generates data.

In addition, the source data centre 110 may include a backup component 118. The backup component 118 may be a component that generates the backup data 104 from the production or test servers 114 and 116. Alternatively or in addition, the backup component 118 may be a component that divides the backup data 104 into fragments and distributes the fragments among the data centres 106 in accordance with the distribution plan 102. For example, the backup component 118 may create a full backup by extracting all data stored in a database that operates on one of the production servers 114. Alternatively or in addition, the backup component 118 may generate an incremental backup by extracting database logs from the database. Alternatively or in addition, the backup component 118 may generate the full backup or the incremental backup from a data source other than the database. The incremental backup may include changes made since a previously generated full backup or since a previously generated incremental backup. During recovery, the incremental backup may be applied to the previously generated full backup, for example, in order to recover to a particular point in time.

Each of the data centres 106 may be one or more physical sites that each contains one or more storage units 120. Alternatively or in addition, each of the data centres 106 may be a logical collection of one or more storage units 120. In one example, each of the data centres 106 may include one or more storage zones 122. Each of the storage zones 122 may be a logical collection of one or more of the storage units 120 within the data centre 106. In a second example, one or more of the data centres 106 may not include any storage zones 122.

Each of the storage units 120 may include a device that stores data. Examples of the storage units 120 may include a server, a storage drive, low cost disks such as JBODs (Just a Bunch of Disks), or any other device that stores data. The storage type of each of the storage units 120 may be different than one or more of the other storage units 120. Examples of the types of storage units 120 may include SATA (serial access), iSCSI (internet Small Computer System Interface) and FC (Fibre Channel) compliant devices. Each type of storage unit may have corresponding data read/write rate characteristics. The cost of the storage units 120 may vary in cost based on the type of the storage unit.

The recovery data centre 112 may be one or more physical sites that each contains one or more devices. Alternatively or in addition, the recovery data centre 112 may be a logical collection of one or more devices. In particular, the recovery data centre 112 may include one or more devices that store data 124 recovered from the fragments of the backup data 104 that are distributed across the data centres 106. The recovery data centre 112 may include production servers 114 like the source data centre 110. Accordingly, if the entire source data centre 110 fails, then the recovery data centre 112 may come online to replace the source data centre 110.

The data placement planner 108 may be any component or combination of components that generates the distribution plan 102. Examples of the data placement planner 108 include software, hardware, or a combination thereof.

The distribution plan 102 may include an indication of how to distribute the fragments across the data centres 106. For example, the distribution plan 102 may include the number of the fragments of the backup data 104 to distribute to each respective one of the data centres 106. As described in more detail below, the fragments that are to be distributed may be encoded fragments.

The data centres 106 that store the backup data 104, the source data centre 110, and the recovery data centre 112 may be interconnected via a network 126. The network 126 may include a local area network (LAN), a wide area network (WAN), the Internet, a wireless local area network (WLAN), a personal area network (PAN), any other now known or later developed communications network, or any combination thereof. Each of data centres 106, 110, and 112, may be connected to each other over links 127 in the network 126, such as the links 127 individually designated $L_{S1}$, $L_{S2}$, $L_{S3}$, $L_{S4}$, $L_{12}$, $L_{13}$, $L_{14}$, $L_{S1}$, $L_{23}$, $L_{24}$, and $L_{34}$. The links 127 may be dedicated full duplex high-speed links, WAN connections, or any other type or combination of connection or communication path. The interconnections (not shown) between the storage zones 122 within any particular one of the data centres 106 may be, for example, very high-speed gigabit backplanes, LAN connections, or other type of connection.

The data placement planner 108 may be in communication with the source data centre 110 over the network 126. Alternatively, the data placement planner 108 may be included in the source data centre 110 (primary data centre). For example, the data placement planner 108 may run on one or more of the production servers 114 and/or test servers 116 in the source data centre 110 and communicate with the backup component 118. Alternatively, the data placement planner 108 may be included in a standalone computer in the source data centre 110 (primary data center) or a different site or data centre.

The system 100 may include additional, fewer, or different components. For example, the system 100 may include fewer or additional data centres 106. Alternatively or in addition, the source data centre 110 and recovery data centre 112 may be the same data centre. Alternatively or in addition, in an example where the system 100 does not perform the backup, the system 100 may include just the data placement planner 108.

Each one of the components of the system 100 may include additional, fewer, or different components. For example, the source data centre 110 may not include the test servers 116. In another example, the data centres 106 may not include any of the storage zones 122 or a different number of the storage zones 122.

When implementing Disaster Recovery and Business Continuity planning (DCP), the backup data 104 may be backed up periodically and kept in physically separate, secure locations, such as in the data centres 106 illustrated in FIG. 1. In the event of an operational disruption at the source data centre 110, operation of the source data centre 110 may be resumed at an alternate site, such as the recovery data centre 112. Applications and/or services may be instantiated on the recovery data centre 112 from the recovered data 124.

Recently, cloud computing and cheap storage technologies are promising to change the Disaster Recovery (DR) technology landscape. Software as a Service (SaaS) based backup service providers are tying up with storage vendors like Hewlett-Packard, EMC Corporation, and Oracle Corporation, to provide cloud-based online data backup solutions. Amazon S3, GoGrid®, which is a registered trademark of GOGRID, LLC, LiveVault®, which is a registered trademark of Iron Mountain, and Mozy®, which is a registered trademark of Decho Corporation, are examples of a new generation of online remote data backup service providers.

Due to lack of operational control and security, reliability issues, and/or availability issues, an organization of any size that uses public SaaS (Software as a Service) or a storage cloud provider as data backup option may break up and distribute the backup data 104 to multiple cloud locations and providers. The multiple cloud locations and providers may correspond to the data centres 106 illustrated in FIG. 1. By locating the data centres 106 in the cloud and/or in multiple, geographically separated locations, fault tolerance and availability may be improved. Accordingly, an enterprise using the cloud as a data backup location for disaster recovery may develop an appropriate plan for distributing to, and aggregating from, geographically distributed and non-correlated services. In addition, organizations that may not be using SaaS or a storage cloud provider, but that have data centres in multiple geographies (in US, Latin America, Europe, Asia, Australia etc), may improve fault tolerance and availability by using one regional data centre as the source data centre 110 and another regional data centre as the recovery data centre 112.

The production servers 114 may run at the source data centre 110 where executable code and customer data may be located. The backup component 118 or other software may make a periodic backup resulting in the backup data 104 being stored in local storage, such as in one of the production servers 114. The backup component 118 or other component may, in the process of making the periodic backup, perform data multiplexing and de-duplication when generating the backup data 104. The backup component 118, or other component, may then spread the backup data 104 across the data centres 106 that the organization owns and/or across the data centres 106 that the public cloud storage providers control. In the event of failure at the source data centre 110, the backup data 104 may be recovered at the recovery data centre 112 on demand. The failure may include, for example, an equipment failure, a software failure, a disaster, theft of equipment or data, or any other event resulting in the loss of data or equipment.

Generating the recovered data 124 may be an I/O (input/output) and compute heavy operation. Consequently, in one example, a server farm (not shown) may perform the bulk recovery for one or more multiple customers. As discussed above, distributing the backup data 104 or fragments of the backup data 104 across the data centres 106 may help to reduce the risk of a single geographic point of failure. To provide communication and consistency in managing backups across the data centres 106, a peer-to-peer (p2p) based storage overlay layer may be created across the data centres 106.

Determining a strategy for data placement and distribution across the data centres 106 has involved guesswork and trial and error in the past. For example, there was no way of determining if the backup data 104 could be recovered within a predetermined time frame without testing the chosen distribution. In addition, any selected strategy may be sub-optimal. For example, pure multi-site replication strategies that make complete copies of the backup data 104 at all of the data centres 106 may involve copying more data than is really necessary.

In contrast, the data placement planner 108 may generate the distribution plan 102 such that the distribution plan 102 satisfies a set of constraints 128. For example, the constraints 128 may include recovery focused constraints such as target recovery or backup times. Alternatively or in addition, the constraints 128 may include constraints relating to cost, data footprint, data security, availability and disaster recoverability. The distribution plan 102 that the data placement planner 108 generates may be the solution that maximizes or minimizes a given function while still satisfying the constraints 128.

1.1 Operation of the System

During operation of the system 100, the data placement planner 108 may generate the distribution plan 102 based on one or more mathematical models. In a first example, the data placement planner 108 may generate the distribution plan 102 for a single customer based on the constraints 128 for the customer. In a second example, the data placement planner 108 may determine a distribution plan 102 for multiple customers, from the perspective of a data recovery (DR) service provider, that satisfies the constraints 128 set by the customers and/or the DR service provider.

Each customer may be a person or an organization that plans to backup the backup data 104. For example, the customer may be a customer internal to the organization, such as an IT (Information Technology) department. Alternatively, the customer may be a customer of the DR service provider or other service provider that is external to the service provider.

The data placement planner 108 may generate the distribution plan 102 by applying mathematical techniques to a model of the data centres 106 with a set of parameters as inputs. The parameters may be included in the constraints 128 that apply to the distribution plan 102. Any of the data centres 106 (including the source data centre 110 and the recovery data centre 112) that are capable of storing all or part of the backup data 104 may be modeled as a data centre. Alternatively or in addition, any of the storage zones 122 included in the data centres 106 may be modeled as a data centre. For example, if Data Centre 1 (DC1) includes Storage Zone 1 (SZ1) and Storage Zone 2 (SZ2), then Data Centre 1 may be modeled as two data centres: DC1_Z1 and DC1_Z2. If there are n data centres 106 and/or storage zones 122, any of these n data centres 106 and/or storage zones 122 may be used to store backup data for a customer.

Some of the parameters may be negotiated between the customer and the DR service provider. For example, the DR service provider may agree to provide the customer with a service that conforms to a service level agreement (SLA). The SLA may include the negotiated parameters. In the case of multiple customers, each of the customers may have a service level agreement that falls into one of multiple bands or categories, such as Gold, Silver and Bronze. The bands or categories may vary by cost. Parameters may include, for example, a protection level (PL), a data centre exclusion list, a data centre inclusion list, recovery time objective (RTO), recovery point objective (RPO), costs, infrastructural constraints, such as storage capacity of the data centres 106, bandwidth of the links 127 and/or the network 126, read/write speeds of the storage units 102 (Input/Output Operations Per Second or IOPS), or any other parameter that may be a constraint on the distribution plan 102.

The protection level may indicate the degree to which the customer accepts simultaneous failures of the data centres 106. The protection level may be an integer number or some other type of number. For example, the protection level may indicate the number of the data centres 106 that may simultaneously fail and still be able to recover the backup data 104. Alternatively or in addition, the protection level may indicate the number of data centres 106 that may not simultaneously fail and still be able to recover the backup data 104. If the protection level is the number of data centres 106 that may not simultaneously fail and there are n data centres 106 not including the source data centre 110, then the maximum protection level may be n. Alternatively, the maximum protection level may be n−1 if one of the n data centres 106 is the source data centre 110. The less acceptable the simultaneous failures are, the higher the cost to provide the protection level.

The data centre exclusion list and the data centre inclusion list indicate which of the data centres 106 are to be excluded or included, respectively, from a list of the data centres 106 that may store the backup data 104. The choice of which of the data centres 106 and/or zones 122 to include in the data centre exclusion list or the data centre inclusion list may depend on geographic and regulatory considerations. For example, a customer based in the United States may include the data centres 106 located in the United States and/or exclude the data centres 106 located outside of the United States. In another example, a banking customer may demand that the backup data 104 be copied only to the data centres 106 that comply with a credit card standard, such as the PCI (Payment Card Industry) Data Security Standard.

The recovery time objective (RTO) may indicate an upper bound on the amount of time that may be taken to recover the backup data 104. For example, the RTO may indicate the maximum amount of time that may be taken, after a failure at the source data centre 110, to restore the entire backup data 104 at the recovery data centre 112 and resume operations at the at the recovery data centre 112.

The recovery point objective (RPO) may indicate the amount of data loss, which may be measured in time, that is acceptable to the customer. Thus, the RPO may indicate an upper bound on the amount of time within which each incremental backup (otherwise known as a delta backup or a level 1 backup) is to be completed. Accordingly, the RPO may also indicate an upper bound on how old the backup data 104 in the data centres 106 may be.

The customer may provide a maximum total cost parameter. The total cost may include storage costs. Most of the network may be leased and paid for by the leaser irrespective of usage. Consequently, network costs may be effectively ignored in some examples. Alternatively or in addition, the total costs may include network costs. In one example, total cost incurred by the customer may be determined as the sum of the storage costs in each of the data centres 106 in which the backup data 104 is stored. The costs incurred by the customer may also include network costs determined, for example, as a formulation in which per quantum of the bandwidth is charged. Any other cost estimation or determination mechanisms may be used to determine or estimate costs.

The backup data 104 may be modeled as a single file even though the backup data 104 may be an aggregate of multiple user and application data, log files, system configuration files, or other data files. The backup data 104 may or may not be encrypted. The backup data 104 may include a full backup file, which may be referred to as a Level 0 backup ($L_0$ backup). The backup data 104 may change over time. For example, the backup component 118 may periodically generate a new full backup file, and the backup data 104 may include the new full backup file. Alternatively or in addition, the backup data 104 may include one or more incremental backup files that are periodically generated by the backup component 118. Each incremental backup file may include changes and/or additions to the full backup data made over a determined time period, such as between times $T_i$ and $T_{i-1}$. Each incremental backup may be referred to as a Level 1 ($L_1$) or delta backup.

The backup data 104 may include groups of data or files that are each specific to a customer. Alternatively, the backup data 104 may be for one customer.

To determine the distribution plan 102, the data placement planner 108 may combine an encoding scheme to encode the backup data 104 with a constraint satisfaction mechanism for satisfying the constraints 128. The encoding scheme may include any scheme that transforms any original data set comprising k fragments into a larger data set comprising n coded fragments, such that the original k fragments can be recovered from a subset of the n coded fragments. Any type of encoding scheme may be used. For example, the encoding scheme may include erasure coding (EC). Alternatively or in addition, the encoding scheme may include a regenerating code (RC).

Erasure coding (EC) is a forward error correction (FEC) code for binary erasure channels. EC is frequently used in networking, such as in multicast FEC. An XOR (exclusive OR operation) may be used to code m fragments with k error-correcting codes in order to achieve n=(m+k) coded fragments, with a coding rate r=m/(m+k), where the data in the original m fragments may be recovered from any m fragments to get back the data.

Accordingly, when the backup component 118 at the source data centre 110 backs up the backup data 104, the backup component 118 may break up the backup data 104 into k fragments, encode the k fragments into n coded or encoded fragments, and distribute the n encoded fragments across the data centres 106 in accordance with the distribution plan 102. During recovery at the recovery data centre 112, any k of the encoded fragments may be collected and decoded in order to obtain the backup data 104. In one example, each of the original or input k fragments are one size, each of the n coded fragments are one size, and the size of each of the original k fragments is the same as the size of each of the n coded fragments. Alternatively, the sizes of the original and coded fragments may vary.

The encoding may be carried out at the source data centre 110 in real time, which may add to the time to complete the backup. Similarly, the decoding may be carried out at the recovery data centre 112 in the real time, which may add to the time to complete the recovery.

The constraint satisfaction mechanism may include the application of any mathematical optimization that determines a solution based on a set of constraints, such as the constraints 128 on the distribution plan 102. For example, the constraint satisfaction mechanism may include linear programming. Linear programming is a technique for the optimization of a linear objective function, subject to linear equality and/or linear inequality constraints. Alternatively or in addition, the constraint satisfaction mechanism may include heuristics or experienced-based analysis. Examples of an objective function for DR recovery may include a cost function, an RPO function, a RTO function, or any other objective expressed as a mathematical function.

By combining the encoding scheme and the constraint satisfaction mechanism, the data placement planner 108 may determine the distribution plan 102 that optimizes one or more objective functions while satisfying the constraints 128. To use the constraint satisfaction mechanism, the data placement planner 108 may model the constraints 128 as the linear equality and/or linear inequality constraints. The data placement planner 108 may supply an objective function specific to backup or recovery, such as a cost function, an RPO function, a RTO function, or any other objective expressed as a mathematical function. The generated distribution plan 102 may include the number of the encoded fragments of the backup data 104 to distribute to each respective one of the data centres 106. In particular, the data placement planner 108 may solve for the number of coded fragments, $X_i$ to store in data centre i given the constraints 128, such as the costs, the protection level, the RPO, the RTO.

For example, the data placement planner 108 may generate the distribution plan 102 for erasure coded fragments of the backup data 104 across the data centres 106 based on the constraints 108 such that:

A. the backup and the recovery may be performed while remaining within the cost bound, the Recovery Point Objective (RPO), and the Recovery Time Objective (RTO);

B. the placement of the backup data across the data centres 106 may be based on customer preference for locations, if any, by the data centre exclusion list and/or the data centre inclusion list; and C. the data replication level and footprint may be kept at minimum level, and the footprint may be prevented from exceeding a point-to-point full data replication to each of the data centres 106.

Each of the storage units 120 may be divided into logical blocks of storage or buckets. Accordingly, the size of the buckets may be selected based on the size of the unit of storage sold, or based on any other criteria, such as based on a multiple of the logical block size used on one or more of the storage units 120. The size of each of the buckets may be the same as the other buckets, or vary depending on the data centre 106 and/or the storage zone 122. The coded fragments of the backup data 104 may be stored in these buckets. In one example, the size of each of the original fragments of the backup data 104 and each of the encoded fragments of the backup data 104 may be selected to be the bucket size.

To illustrate, the customer may have to backup the backup data 104 that consists of, for example, a file of size 100 gigabytes (GB). The customer may want to backup the file across three of the data centres 106 to support geographic fault tolerance. Furthermore, the customer may want to backup the file such that that the backup data 118 is protected for simultaneous failure of up to two of the data centres 106 in event of a failure. The RPO for the customer may have an upper bound of T1 hours and the RTO for the customer may have an upper bound of T2 hours. The customer may desire to pay at most C dollars for the protection and recovery.

The data placement planner 108 may be configured to use a bucket size of 20 GB, for example. The 100 GB file may be divided into bucket-sized chunks or fragments. Accordingly, the 100 GB file may be divided into five fragments (100 GB filed divided into 20 GB buckets). The five fragments are to be encoded into more than five fragments, which are then in turn distributed across the three data centres 106. The data placement planner 108 may determine the number of encoded fragments and the appropriate distribution, $X_i$, across the data centres 106 according to a set of one or more objective functions and the constraints 128.

Then, the data placement planner 108 may solve a mathematical formulation with the encoding scheme and the constraint satisfaction mechanism in order to obtain a combination of encoded fragment distribution that ensures a predetermined level of reliability and that minimizes the total cost for the customer or customers while staying within the RPO and/or RTO bounds of T1 and T2, respectively. Alternatively or in addition, the data placement planner 108 may solve the mathematical formulation with the encoding scheme and the constraint satisfaction mechanism in order to obtain a combination of encoded fragment distribution that ensures a predetermined level of reliability and that minimizes RPO and/or RTO time while staying with the cost bound, C. More generally, the data placement planner 108 may solve the mathematical formulation with the encoding scheme and the constraint satisfaction mechanism in order to determine how to distribute the encoded fragments across the data centres 104 such that an objective function falls on or below a threshold value and the constraints 128 are satisfied. For example, the threshold value may be a minimum or maximum of the objective function. The objective function may be a mathematical equation that represents the RPO time, the RTO time, or some other objective.

The data placement planner 108 may generate the distribution plan 102 without performing an actual backup in accordance with the distribution plan 102. The actual backup may be performed by the backup component, for example. Alternatively, the data placement planner 108 may perform the backup. There is a difference between data recovery and full application recovery. Restoring and/or recovering data in a proper manner may be a first step in recovering the recovery site 112. Data recovery may be made full or partial depending on what services the client wants to bring up (in staggered manner) once the recovery happens. The data placement planner 108 may plan for full data recovery. Application recovery, such as application configuration, restart and health-check, may be performed before full application recovery. Application recovery may or may not be addressed by the data placement planner 108.

1.2 Single Customer Model

In the single customer example, the data placement planner 108 may find a lowest cost data distribution plan 102 that falls within the RPO and/or the RTO. Alternatively or in addition, the data placement planner 108 may find a lowest RTO solution, a lowest RTO data distribution solution, or a differently optimized solution. The customer may provide the data placement planner 108 with a set or range of values as parameters.

Examples of the parameters that the data placement planner 108 may receive as input parameters, or determine, are provided in Table 1 below. The parameters may be used in the single customer backup and recovery context.

TABLE 1

| Parameter | Description |
| --- | --- |
| $F_{Cust}$ | Total size of full backup file ($L_0$) for customer |
| $B_{Cust}$ | Total size of delta backup file ($L_1$) for customer |
| Bucket_size | The bucket size, which may be same across all storage units 120 in the data centres 106 |
| $m_e$ | Total number of input (to-be coded) fragments for the customer $\lceil F_{Cust/bucket\_size} \rceil$ or $\lceil B_{Cust/bucket\_size} \rceil$ |
| $n_e$ | Total number of output (coded) fragments for the customer |
| $e_r$, $d_r$ | Rate of encoding and rate of decoding, respectively, at the source data centre 110 and the recovery data centre 112, respectively |
| $i = \{1, \ldots, n\}$ | Index of the data centres 106, where n is the total number of data centres 106 |
| $BW_{ij}$ | Available network bandwidth from data centre i to data centre j |
| IOPS | Input/Output Operations Per Second, which may be used to calculate the data read/write rate in storage units 120 (for example, FibreChannel, iSCSI or SATA read/write rates) |
| No_of_disks | Number of mirrored disks in the storage unit 120 of a data centre, which may be used to calculate the data read/write rate in storage units 120 |
| segment_size | Size of a throughput segment in the storage unit 120 of a data centre (in megabytes, for example), which may be used to calculate the data read/write rate in storage units 120 (not the size of each of the original or encoded fragments of the backup data 104) |
| $BW_{ij_{act}}$ | Actual available bandwidth between data centres i and j, which may be less than the network bandwidth if the read/rates in the storage units 120 of data centres i and j in are lower than $BW_{ij}$ |
| $c_i$ | Weighted average cost of storage per unit of storage (for example, dollars per byte) in data centre i |
| $X_i$ | Number of coded fragments to be stored in data centre i, where $n_e = \sum_{i=1}^{n} X_i$ |
| $P_b$ | Upper bound for incremental backup time for the customer data of size $B_{Cust}$ (equivalent to RPO) |
| $T_b$ | Upper bound for recovery time for the customer data of size $F_{Cust}$ (equivalent to RTO) |
| $C_b$ | Cost bound for the customer |
| $S_i$ | Total available storage in i-th data centre |

The following parameters are examples of input parameters: $F_{Cust}$, $B_{Cust}$, $m_e$, $e_r$, $d_r$, bucket_size, $BW_{ij}$, $c_i$, $P_b$, $T_b$, IOPS, no_of_disks, segment_size, $C_b$. The data placement planner 108 may determine $X_i$ and, therefore, $n_e$. The parameters are for illustrative purposes only. Accordingly, the parameters may include fewer, additional, or different parameters than those listed in Table 1. For example, a single parameter that indicates the data read/write rate for the storage units 120 may be used instead of the three parameters IOPS, No_of_disks, and segment_size.

1.2.1 Formulation of Objectives and Constraints

In the single customer example, three common objectives for the customer may include:

Objective 1: Minimize cost of storage and replication for the customer while maintaining the RTO, RPO and PL constraints.

Objective 2: Minimize the RTO (recovery time) for a customer while keeping the cost bound and RPO time bounds Objective 3: Minimize the RPO (backup time) for a customer while keeping the cost bound and RTO time bounds The constraints 128 may include, for example, RPO constraints, RTO constraints, PL (Protection Level) constraints, a data centre exclusion list constraint, a storage availability constraint, and an available bandwidth constraint. Examples of how each of these constraints 128 may be modeled are provided in the following paragraphs.

RPO Constraints: $L_1$ delta to be pushed from the source data center 110, S, into storage data centres within $P_b$ time, may be written as:

$$\left(\frac{1}{e_r} * B_{Cust} + \max_{j=1}^{n}\left(\frac{1}{BW_{sj_{act}}} * \frac{B_{Cust}}{m_e} * X_j\right)\right) \leq P_b$$

Re-writing, $$\max_{j=1}^{n}\left(\frac{1}{BW_{sj_{act}}} * X_j\right) \leq \left(\left(\frac{P_b}{B_{Cust}} - \frac{1}{e_r}\right) * m_e\right)$$

Re-writing in standard linear programming form, $$\forall j\{1, \ldots n\}\left[\left(\frac{1}{BW_{sj_{act}}} * X_j\right) \leq \left(\left(\frac{P_b}{B_{Cust}} - \frac{1}{e_r}\right) * m_e\right)\right]$$

RTO Constraints: $L_0$ backup is to be restored from the data centres 106 to the source data center 110, S, within $T_b$:

$$\left(\frac{1}{d_r} * F_{Cust} + \max_{j=1}^{n}\left(\frac{1}{BW_{js_{act}}} * \frac{F_{Cust}}{m_e} * X_j\right)\right) \leq T_b$$

Re-writing in standard linear programming form, $$\max_{j=1}^{n}\left(\frac{1}{BW_{js_{act}}} * X_j\right) \leq \left(\left(\frac{T_b}{F_{Cust}} - \frac{1}{d_r}\right) * m_e\right)$$

$$\forall j\{1, \ldots n\}\left[\left(\frac{1}{BW_{js_{act}}} * X_j\right) \leq \left(\left(\frac{T_b}{F_{Cust}} - \frac{1}{d_r}\right) * m_e\right)\right]$$

PL (Protection Level) Constraints: Enough coded fragments are to be spread across the data centres 106 so that a failure of up to PL data centres 106 may be tolerated. To support a failure of a single data centre j, $$\forall j\{1, \ldots n\} \sum_{i=1, i\neq j}^{n} X_i \geq m_e$$

So, in order to support a protection level of up-to k simultaneous failures of the data centres 106, enough coded fragments of the backup data 104 are to be in $^nC_{n-k}$ data centres 106 in order to recover the backup data:

$$S = \{1, \ldots, n\}; \forall O \in \mathcal{R}(S, n-k)\left[\sum_{i \in O} X_i \geq m_e\right]$$

where $\mathcal{R}(S,n-k)$ is the combination from a data centres set S taken (n-k) at a time.

Data Centre Exclusion List Constraint: The customer may want to exclude a proper subset, Q, of the data centres 106 from including any fragments of the backup data 104

$$X_i = 0, i \in Q, Q \subset \{1, \ldots, n\}$$

Storage Availability Constraint: The total size of all of the fragments that are stored in data centre i is to be less than the space available in data centre i:

$$\forall\, i \in \{1, \ldots, n\} \left[ \sum \frac{X_i * F_{Cust}}{M_e} < S_i \right]$$

Available Bandwidth constraint: The actual rate of data transfer from data centre i to data centre j may the smaller of the network bandwidth and the read/write rate of the storage unit 120—the read/write rate of the storage unit 120 is determined in the following example as (IOPS*no_of_disks*segment_size/1024):

$$BW_{ij_{act}} = \text{MIN}(((\text{IOPS} * \text{no\_of\_disks} * \text{segment\_size})/1024), BW_{ij})$$

1.2.2 Cost Minimization Objective

The objective function for cost minimization may be written as the sum of the product of the size of each coded fragment, the number of coded fragments written to data centre i, and the cost of storage per unit of data in data centre i across all n data centres 106 that store coded fragments of the backup data 104:

$$\text{Minimize} \sum_{i=1}^{n} (F_{Cust}/m_e) * c_i * X_i$$

The objective function for cost minimization may be subject to the following constraints 128:

$$\forall\, j\{1, \ldots n\} \left[ \left( \frac{1}{BW_{sj_{act}}} * X_j \right) \leq \left( \left( \frac{P_b}{B_{Cust}} - \frac{1}{e_r} \right) * m_e \right) \right] \quad (i)$$

$$\forall\, j\{1, \ldots n\} \left[ \left( \frac{1}{BW_{js_{act}}} * X_j \right) \leq \left( \left( \frac{T_b}{F_{Cust}} - \frac{1}{d_r} \right) * m_e \right) \right] \quad (ii)$$

$$S = \{1, \ldots, n\};\; \forall\, O \in \mathcal{R}(S, n-k) \left[ \sum_{i \in O} X_i \geq m_e \right] \quad (iii)$$

$$X_i = 0,\; i \in Q,\; Q \subset \{1, \ldots, n\} \quad (iv)$$

$$\forall\, i \in \{1, \ldots, n\} \left[ \sum \frac{X_i * F_{Cust}}{M_e} < S_i \right] \quad (v)$$

$$B_{js_{act}} = \text{MIN}(((IOPS * \text{no\_of\_disks} * \text{segment\_size})/1024), B_{js}) \quad (vi)$$

1.2.3 RPO Minimization Objective

The objective function for minimization of the RPO may involve minimizing the time to backup the increment backup, $L_1$ delta, across each of the data centres 106 that store coded fragments of the backup data 104:

$$\text{Minimize}\left( \frac{1}{e_r} * B_{Cust} + \max_{j=1}^{n}\left( \frac{1}{BW_{sj_{act}}} * \frac{B_{Cust}}{m_e} * X_j \right) \right)$$

which may be written as:
minimize t such that, $$\forall\, j\{1, \ldots n\} \left[ \left( \frac{1}{BW_{sj_{act}}} * \frac{B_{Cust}}{m_e} * X_j \right) + \left( \frac{1}{e_r} * B_{Cust} \right) < t \right]$$

The objective function for minimizing the RPO may be subject to the following constraints 128:

$$\sum_{i=1}^{n} (F_{Cust}/m_e) * c_i * X_i \leq C_b \quad (i)$$

$$\forall\, j\{1, \ldots n\} \left[ \left( \frac{1}{BW_{js_{act}}} * X_j \right) \leq \left( \left( \frac{T_b}{F_{Cust}} - \frac{1}{d_r} \right) * m_e \right) \right] \quad (ii)$$

$$S = \{1, \ldots, n\};\; \forall\, O \in \mathcal{R}(S, n-k) \left[ \sum_{i \in O} X_i \geq m_e \right] \quad (iii)$$

$$X_i = 0,\; i \in Q,\; Q \subset \{1, \ldots, n\} \quad (iv)$$

$$\forall\, i \in \{1, \ldots, n\} \left[ \sum \frac{X_i * F_{Cust}}{M_e} < S_i \right] \quad (v)$$

$$B_{js_{act}} = \text{MIN}(((IOPS * \text{no\_of\_disks} * \text{segment\_size})/1024), B_{js}) \quad (vi)$$

1.2.4 RTO Minimization Objective

The objective function for minimizing the RTO may involve minimizing the time to retrieve the full backup, $L_0$, for each of the data centres 106 that store coded fragments of the backup data 104:
Minimize $$\left( \frac{1}{d_r} * F_{Cust} + \max_{j=1}^{n}\left( \frac{1}{BW_{js_{act}}} * \frac{F_{Cust}}{m_e} * X_j \right) \right)$$

which may be written as minimize t such that, $$\forall\, j\{1, \ldots n\} \left[ \left( \frac{1}{BW_{js_{act}}} * \frac{F_{Cust}}{m_e} * X_j \right) + \left( \frac{1}{d_r} * F_{Cust} \right) < t \right]$$

The objective function for minimizing the RTO may be subject to the following constraints 128:

$$\sum_{i=1}^{n} (F_{Cust}/m_e) * c_i * X_i \leq C_b \quad (i)$$

$$\forall\, j\{1, \ldots n\} \left[ \left( \frac{1}{BW_{sj_{act}}} * X_j \right) \leq \left( \left( \frac{P_b}{B_{Cust}} - \frac{1}{e_r} \right) * m_e \right) \right] \quad (ii)$$

$$S = \{1, \ldots, n\};\; \forall\, O \in \mathcal{R}(S, n-k) \left[ \sum_{i \in O} X_i \geq m_e \right] \quad (iii)$$

$$X_i = 0,\; i \in Q,\; Q \subset \{1, \ldots, n\} \quad (iv)$$

$$\forall\, i \in \{1, \ldots, n\} \left[ \sum \frac{X_i * F_{Cust}}{M_e} < S_i \right] \quad (v)$$

1.3 Multi-Customer Example

In the multi-customer example, the data placement planner 108 may determine the distribution plan 102 for a group of customers. Each customer in the group may have a different set of parameters or constraints than the other customers, thereby complicating the task of finding the distribution plan 102. Each customer in the group may have a corresponding set of input fragments and/or encoded fragments in the backup data 104.

The data placement planner 108 may determine the distribution plan 102 for a group of customers in a manner similar to that described for the single customer example. In particular, the distribution plan 102 may include the number of the set of encoded fragments for each respective one of the customers that are to be stored in each respective one of the data centres 106. However, determining the schedule in which the customers are to be backed up, satisfying the constraints 128 of all of the customers, determining the time for backup and recovery of the backup data 104 for each of the customers, and, thus, determining the total time for backup and recovery of all or a subset of the customers is an extremely computationally difficult, NP-Hard (non-deterministic polynomial-time hard) problem. Accordingly, in the multi-customer example, the data placement planner 108 may optimize objectives, such as cost, instead of the time required to backup or recover the backup data 104 of the customers.

The recovery time objectives (RTO) and/or the recovery point objectives (RPO) of the customers may be formulated as one or more constraints. For example, the constraints 128 may include a constraint that the backup data 104 for all of the customers in a set of customers is to be backed up or recovered within a particular time window given the constraints 128 of each of the customers. The time window may be referred to as a complete or overall time window. The complete time window may be divided into discrete units called time quanta. The RPO or the RTO for each of the customers may be associated with a corresponding one of the time quanta. In addition, the bandwidth of the links 127 between the data centres 106 during each one of the time quanta may shared by one or more of the customers. The amount of bandwidth of the links 127 that is allocated to a customer in a time quantum may limit the amount of data for that customer that may be backed up or recovered during the time quantum. Accordingly, the data placement planner 108 may determine the distribution plan 102 based on a constraint that the backup data 104 for all of the customers in a set of customers is to be backed up within a first time window. Alternatively or in addition, the data placement planner 108 may determine the distribution plan 102 based on a constraint that the backup data 104 for all of the customers in a set of customers is to be recovered within a second time window.

Figure 2:
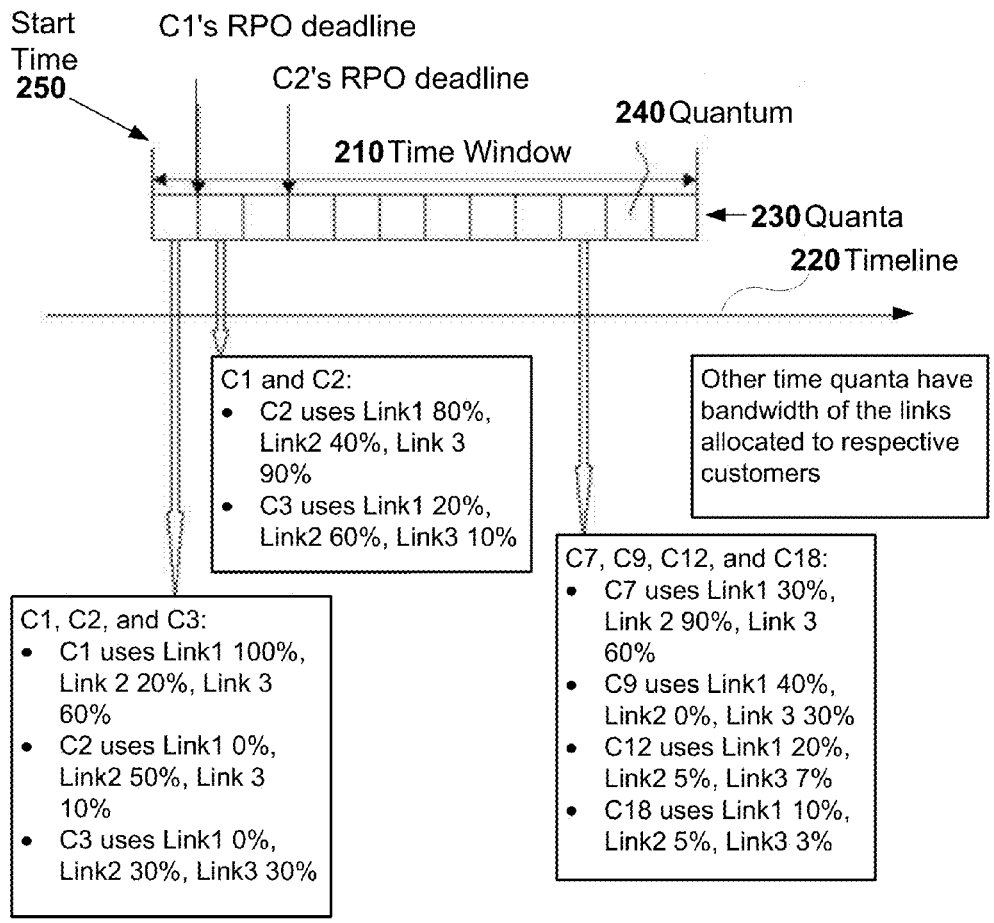
FIG. 2 illustrates an example of a time window divided into quanta for modeling constraints of multiple customers.

FIG. 2 illustrates an example of a time window 210 on a timeline 220 within which an incremental backup for each customer in a set of the customers (individually designated C1, C2, C3, C7, C9, C12, and C18) is to be completed. In other words, in the example illustrated in FIG. 2, the time window 210 may represent an amount of time within which the incremental backups for all of the customers in the set of customers are to be completed. The time window 210 may be selected to be at least as long as the longest recovery point objective (RPO) of the customers in the set of customers. Alternatively, if the time window 210 represents the window for recovering all of the customers backup data 104, then the time window 210 may be selected to be at least as long as the longest recovery time objective (RTO) of the customers in the set of customers.

The time window 210 may be divided into time quanta 230. The number of the time quanta 230 and the duration of each of the time quanta 230 may vary. Any number of time quanta 230 may be selected, and the time quanta 230 may be selected to have any duration. The time quanta 230 do not all have the same duration. In one example, the time window 210 may be ten hours, which may be divided into ten time quanta 230, each having a duration of one hour. In a second example, the time window 210 of ten hours may be divided into twenty time quanta 230, each having a duration of thirty minutes. In a third example, the time window 210 of ten hours may be divided into five quanta 230, each having a duration of one hour, and ten quanta 230, each having a duration of thirty minutes.

When selecting the number of time quanta 230 and the duration of each time quantum 240, one consideration may be that, for every time quantum 240 added, the number of variables in the formulation of the equations that the constraint satisfaction mechanism solves may increase. Accordingly, the quantity and durations of the time quanta 230 may be selected such that the number of resulting variables in the formulation of the questions may be handled by the constraint satisfaction mechanism within a target time frame and/or a target computational complexity.

The time quanta 230 may represent time slots ordered chronologically, starting at a start time 250. For example, the time quanta 230 in FIG. 2 are designated 1 through 12, respectively, where the first time quantum 240 is the first timeslot after the start time 250. The start time 250 may represent the time at which a failure occurs, the time at which backups for the customers start, or some other event.

The RPO or the RTO for each of the customers may be associated with a corresponding one of the time quanta 230. For example, in FIG. 2, The RPO of customer C1 is associated with the first time quantum 240 of the time window 210, and the RPO of customer C2 is associated with the third time quantum 240. The RPOs of the other customers (C3, C7, C9, C12, and C18) may be associated with corresponding time quanta 230 (not shown). Similarly, the RTOs of the customers may be associated with corresponding time quanta 230. For any RPO or RTO value, the time quantum 240 corresponding to the value may be the nth time quantum 240, such that the value falls between the start time of the nth time quantum 240 and the end time of the nth time quantum 240.

As mentioned above, the link bandwidth of the links 127 in the network 126 may be divided among the customers. For example, during the first time quantum 240, C1 may be allocated 100 percent of link 1, 20 percent of link 2, and 60 percent of link 3. During the second time quantum 240, C1 may not be allocated any bandwidth because C1's RPO should be met in the first time quantum 240; C2 may be allocated 80 percent of Link 1, 40 percent of link 2, and 90 percent of link 3; and C3 may be allocated 20 percent of link 1, 60 percent of link 2, and 10 percent of link 3. As another example, during the tenth time quantum 240, 30 percent, 40 percent, 20 percent, and 10 percent of the bandwidth of link 1 may be allocated to customers C7, C9, C12, and C18, respectively; 90 percent, 0 percent, 5 percent, and 5 percent of the bandwidth of link 2 may be allocated to customers C7, C9, C12, and C18, respectively; and 60 percent, 30 percent, 7 percent, and 3 percent of the bandwidth of link 3 may be allocated to customers C7, C9, C12, and C18, respectively. In addition, the bandwidth of links 1, 2, and 3, may also be allocated to the customers in each remaining time quantum 240 (not shown).

Alternatively, the link bandwidth may not be shared by the customers. The link bandwidth sharing may be done to support the formulation of the equations that the constraint satisfaction mechanism solves. Alternatively, any provably feasible schedule for backup and/or recovery of the backup data 104 of the customers may be determined through a greedy strategy without bandwidth sharing. In one example of a greedy strategy, recovery of the backup data 104 for all of the customers may be arranged in increasing order of the respective RTO constraints of the customers. In other words, the customer with the lowest RTO would get all of the bandwidth until the backup data 104 for the customer is recovered, then a next customer with the next lowest RTO would get all of the bandwidth until the backup data 104 for the next customer is recovered, and so on.

Through the linear programming formulation described below, the data placement planner 108 may determine the feasibility of the time window 210 in polynomial time. An algorithm is said to be solvable in polynomial time if the number of steps required to complete the algorithm for a given input is $O(n^k)$ for some nonnegative integer k, where n is the complexity of the input. Accordingly, the data placement planner 108 may check multiple time windows 210 in order to determine a time window 210 in which the constraints 128 of the customers are satisfied.

Examples of the parameters that the data placement planner 108 may receive as input parameters, or determine based on the constraints 128, are provided in Table 2 below. The parameters are for use in the multi-customer backup and recovery context. The parameters are for illustrative purposes only—the parameters may include fewer, additional, or different parameters than those listed in Table 2.

TABLE 2

| Parameters | Explanation |
|---|---|
| $Cust_i$ | $i^{th}$ customer in the system in a set of p customers: $\{1, \ldots, p\}$ |
| $F_{Custi}$ | Total size of full backup file ($L_0$) for $Cust_i$ |
| $B_{Custi}$ | Total size of delta backup file ($L_1$) for $Cust_i$ |
| Bucket_size | The bucket size, which may be the same across all storage units 120 |
| $m_{eCusti}$ | Total number of input (to-be coded) fragments of the backup data 104 for $Cust_i$ |
| $n_{eCusti}$ | Total number of output (coded) fragments for the $Cust_i$ |
| $e_r, d_r$ | Rate of encoding and rate of decoding, respectively, at the source data centre 110 and the recovery data centre 112 |
| $j = \{1, \ldots, n\}$ | Index of the data centres 106, where n is the total number of data centres 106 |
| $BW_{ij_{act}}$ | Actual available total link bandwidth from data centre i to data centre j |
| $\tau_i$ | Unit of time quantum 240 for solution |
| $g_{RPO}, g_{RTO}$ | Identifies the total number of time quanta available by which backups and recoveries, respectively, of all p customers are to complete |
| $L_{Custieabk}$ | Share of link bandwidth allotted to $Cust_i$ from data centre a to data centre b in the $k^{th}$ time quantum 240 during $L_1$ backup. The units of $L_{Custieabk}$ may be bandwidth units, such as megabytes per second. |
| $L_{Custieabk}$ | Share of link bandwidth allotted to $Cust_i$ from data centre a to data centre b in the $k^{th}$ time quantum 240 during recovery. The units of $L_{Custreabk}$ may be bandwidth units, such as megabytes per second. |
| $\gamma_{ab}$ | Avg. cost of usage of link per quantum 240 in pay-per-use model |
| $c_j$ | Weighted Average cost of storage in data centre j |
| $X_{Custij}$ | Number of coded fragments to be stored in data centre j for customer i |
| $P_{Custib}$ | Identifies a time quantum 240 that is the incremental or delta backup deadline for $Cust_i$ (equivalent to RPO) |
| $T_{Custib}$ | Identifies a time quantum 240 that is the recovery deadline for $Cust_i$ (equivalent to RTO) |
| $C_{Custib}$ | Cost bound for $Cust_i$ |
| $S_j$ | Total available storage in data centre j |
| $PL_{Custi}$ | Protection level for $Cust_i$ |
| $Q_i$ | The data centre exclusion list for $Cust_i$ |

1.3.1 Multi-Customer Constraint Functions

The backup deadline constraints for all of the p customers may be modeled as:

$$\forall i \in \{1, \ldots, p\}, \forall j \in \{1, \ldots, n\}, \left[\sum_{k=1}^{P_{Custib}} (L_{Custiesjk} * \tau_k) \geq \frac{B_{Custi}}{m_{eCusti}} * X_{ij}\right]$$

where s is the source data centre 110 and, $$\forall i \in \{1, \ldots, p\}, \forall j \in \{1, \ldots, n\}, [\forall k \in \{P_{Custib}+1, \ldots, g_{RPO}\}, L_{Custiesjk}=0]$$

The recovery deadline constraints for all of the p customers may be modeled as:

$$\forall i \in \{1, \ldots, p\}, \forall j \in \{1, \ldots, n\}, \left[\sum_{k=1}^{T_{Custib}} (L_{Custirjdk} * \tau_k) \geq \frac{F_{Custi}}{m_{eCusti}} * X_{ij}\right]$$

where d is the recovery data centre 112 and, $$\forall i \in \{1, \ldots, p\}, \forall j \in \{1, \ldots, n\}, [\forall k \in \{T_{Custib}+1, \ldots, g_{RTO}\}, L_{Custirjdk}=0]$$

The link capacity constraints may be modeled for the backup of the backup data 104 for all of the p customers, copied from the source data centre 110 s to each of the data centres 106:

$$\forall j \in \{1, \ldots, n\}, \forall k \in \{1, \ldots, g_{RPO}\}, \left[\sum_{i=1}^{p} L_{Custiesjk} \leq BW_{sj_{act}}\right]$$

and the recovery of the backup data 104 for all of the p customers, copied from each of the data centres 106 to the recovery data centre 112 d:

$$\forall j \in \{1, \ldots, n\}, \forall k \in \{1, \ldots, g_{RTO}\}, \left[\sum_{i=1}^{p} L_{Custirjdk} \leq BW_{jd_{act}}\right]$$

The cost constraints for all of the p customers may be modeled as:

$$\forall i \in \{1, \ldots, p\}, \left[\sum_{j=1}^{n} \left(X_{ij} * \frac{F_{Custi}}{m_{eCusti}} * c_j\right) \leq C_{custib}\right]$$

The data centre exclusion list constraints for all of the p customers may be modeled as:

$\forall i \in \{1, \ldots, p\}, [\forall j \in Q_i, X_{ij}=1]$, where $Q_i \subset \{1, \ldots, n\}$ is the data centre exclusion list for $Cust_i$ The protection level constraints for all of the p customers may be modeled as:

$$S = \{1, \ldots n\}, \forall O \in R(S, n - PL_{Custi}), \left[\sum_{i \in O} X_{ij} \geq m_{eCusti}\right]$$

The data centre storage capacity constraint may be modeled as:

$$\forall j \in (1, \ldots, n), \left[\sum_{i=1}^{p} \frac{X_{ij} * F_{Custi}}{M_{eCusti}} < S_j\right]$$

1.3.2 Multi-Customer Example—Storage Cost Minimization Objective

An objective function for minimizing the total storage cost to the DR service provider may involve minimizing the storage costs for storing the coded fragments of all p customers across the data centres 106:

$$\text{Minimize} \sum_{i=1}^{p} \sum_{j=1}^{n} \left(\frac{F_{Custi}}{m_{eCusti}} * X_{ij} * c_j\right)$$

The object function for minimizing the total storage cost may be subject to the following constraints 128:

$$\forall i \in \{1, \ldots, p\}, \forall j \in \{1, \ldots, n\},$$

$$\left[\sum_{k=1}^{P_{Custib}} (L_{Custiesjk} * \tau_k) \geq \frac{B_{Custi}}{m_{eCusti}} * X_{ij}\right]$$

$$\forall i \in \{1, \ldots, p\}, \forall j \in \{1, \ldots, n\},$$

$$[\forall k \in \{P_{Custib} + 1, \ldots, g_{RPO}\}, L_{Custiesjk} = 0]$$

$$\forall i \in \{1, \ldots, p\}, \forall j \in \{1, \ldots, n\},$$

$$\left[\sum_{k=1}^{T_{Custib}} (L_{Custirjdk} * \tau_k) \geq \frac{F_{Custi}}{m_{eCusti}} * X_{ij}\right]$$

$$\forall i \in \{1, \ldots, p\}, \forall j \in \{1, \ldots, n\},$$

$$[\forall k \in \{T_{Custib} + 1, \ldots, g_{RTO}\}, L_{Custirjdk} = 0]$$

$$\forall j \in \{1, \ldots, n\}, \forall k \in \{1, \ldots, g_{RPO}\}, \left[\sum_{i=1}^{P} L_{Custiesjk} \leq BW_{sj}\right]$$

$$\forall j \in \{1, \ldots, n\}, \forall k \in \{1, \ldots, g_{RTO}\}, \left[\sum_{i=1}^{P} L_{Custirjdk} \leq BW_{jd}\right]$$

$$\forall i \in \{1, \ldots, p\}, \left[\sum_{j=1}^{n} \left(X_{ij} * \frac{F_{Custi}}{m_{eCusti}} * c_j\right) \leq C_{Custib}\right]$$

$$\forall i \in \{1, \ldots, p\}, [\forall j \in Q_i, X_{ij} = 0]$$

$$S = \{1, \ldots n\}, \forall O \in R(S, n - RL_{Custi}), \left[\sum_{i \in O} X_{ij} \geq m_{eCusti}\right]$$

$$\forall j \in \{1, \ldots, n\}, \left[\sum_{i=1}^{p} \frac{X_{ij} * F_{Custi}}{M_{eCusti}} < S_j\right]$$

1.3.3 Multi-Customer Example—Link Cost Minimization Objective

If the links 127 are leased and/or purchased on a pay-per-use basis, then the distribution plan 102 may have an associated per link cost. Accordingly, an objective function for minimizing the total link cost to the DR service for backup may involve minimizing the cost of copying the coded fragments of the backup data 104 over the links 127 during backup:

Minimize, $$\sum_{i=1}^{p} \sum_{j=1}^{n} \sum_{k=1}^{g_{RPO}} (L_{Custiesjk} * \gamma_{sj}),$$

with same set of constraints 128 used for minimizing the total storage cost

Similarly, an objective function for minimizing the total link cost to the DR service for recovery may involve minimizing the cost of copying the coded fragments of the backup data 104 over the links 127 during recovery:

$$\sum_{i=1}^{p} \sum_{j=1}^{n} \sum_{k=1}^{g_{RTO}} (L_{Custirjdk} * \gamma_{jd}),$$

with same set of constraints 128 used for minimizing the total storage cost.

The $X_{Custij}$ variable is not included in the above two equations because the link capacity is leased or purchased under a condition that the bandwidth on the links 127 is paid for regardless of whether data is actually transmitted over the links 127.

2.1 Example Results

A linear programming solver (IBM ILOG CPLEX Optimizer) was used to generate the distribution plan 102 for sample scenarios that included hypothetical randomly generated data in the backup data 104. The parameters used in the sample scenarios are described below along with the results of the processing.

Five hypothetical customers were considered. The parameters specific to each of the customers are listed below in Table 3.

TABLE 3

| Customer | Incremental BackUp Size ($L_1$) | Total back-up Size ($L_0$) | Protection Level | Cost Bound |
|---|---|---|---|---|
| C4 | 65.0 GB | 650.0 GB | 3 | 80000.0 $ |
| C3 | 55.0 GB | 550.0 GB | 1 | 75000.0 $ |
| C5 | 75.0 GB | 750.0 GB | 1 | 80000.0 $ |
| C2 | 45.0 GB | 450.0 GB | 2 | 70000.0 $ |
| C1 | 35.0 GB | 350.0 GB | 2 | 60000.0 $ |

Three hypothetical data centres 106, each having two storage zones 122, were considered. The data centres 106 were modeled as six data centres identified in Table 4 below.

TABLE 4

| Data Centre | Zone | Storage Type | Free Storage |
|---|---|---|---|
| DC1 | Z1 | iSCSI | 3 TB |
| DC1 | Z2 | SATA | 3.7 TB |
| DC2 | Z1 | FC | 2 TB |
| DC2 | Z2 | iSCSI | 4 TB |
| DC3 | Z1 | SATA | 5 TB |
| DC3 | Z2 | FC | 3.2 TB |

The parameters specific to the storage characteristics of the storage units 120 are provided in Table 5 below.

TABLE 5

| Storage Type | Cost | IOPS |
|---|---|---|
| iSCSI | .008 $/MB | 750 |
| SATA | .0006 $/MB | 450 |
| FC | .09 $/MB | 24000 |

The bandwidth of the network links 127 between the data centres 106 was considered 10 MBPS (megabits per second). The source data centre 110 was chosen to be zone one in data centre one and the recovery data centre 112 was chosen to be zone two of data centre one. The bucket_size was selected to be 10 GB (gigabytes).

2.2 Example Results—Single Customer

For the single customer case, customer C1 was selected. The data placement planner 108 then attempted to find the distribution plan 102 that minimized cost. Each time the data placement planner 108 attempted to find the distribution plan 102, a different set of values for the RPO and RTO were selected. The results are summarized in Table 6 below.

TABLE 6

| Protection Level | RPO Bound (Hours) | RTO Bound (Hours) | Minimized Cost Objective (Dollars) | m | n | DataCentre/Zone Shares (DC1_Z1, DC1_Z2, DC2_Z1, DC2_Z2, DC3_Z1, DC3_Z2) Fragments |
|---|---|---|---|---|---|---|
| 1 | 1.0 | 4.0 | Infeasible | | | |
| 1 | 1.0 | 4.3 | Infeasible | | | |
| 1 | 1.0 | 4.6 | 15231.0 | 35 | 47 | 8, 8, 8, 8, 8, 7, |
| 1 | 1.0 | 6.0 | 7289.0 | 35 | 46 | 10, 10, 6, 10, 10, 0, |
| 1 | 1.0 | 7.0 | 3033.0 | 35 | 49 | 12, 12, 1, 12, 12, 0, |
| 1 | 1.0 | 24.0 | 1763.0 | 35 | 53 | 17, 17, 0, 2, 17, 0, |
| 1 | 1.2 | 4.0 | Infeasible | | | |
| 1 | 1.2 | 4.3 | Infeasible | | | |
| 1 | 1.2 | 4.6 | 15231.0 | 35 | 47 | 8, 8, 8, 8, 8, 7, |
| 1 | 1.2 | 6.0 | 7289.0 | 35 | 46 | 10, 10, 6, 10, 10, 0, |
| 1 | 1.2 | 7.0 | 3033.0 | 35 | 49 | 12, 12, 1, 12, 12, 0, |
| 1 | 1.2 | 24.0 | 1486.0 | 35 | 57 | 0, 21, 0, 15, 21, 0, |
| 1 | 1.4 | 4.0 | Infeasible | | | |
| 1 | 1.4 | 4.3 | Infeasible | | | |
| 1 | 1.4 | 4.6 | 15231.0 | 35 | 47 | 8, 8, 8, 8, 8, 7, |
| 1 | 1.4 | 6.0 | 7289.0 | 35 | 46 | 10, 10, 6, 10, 10, 0, |
| 1 | 1.4 | 7.0 | 3033.0 | 35 | 49 | 12, 12, 1, 12, 12, 0, |
| 1 | 1.4 | 24.0 | 1277.0 | 35 | 60 | 0, 24, 0, 12, 24, 0, |
| 1 | 1.8 | 4.0 | Infeasible | | | |
| 1 | 1.8 | 4.3 | Infeasible | | | |
| 1 | 1.8 | 4.6 | 15231.0 | 35 | 47 | 8, 8, 8, 8, 8, 7, |
| 1 | 1.8 | 6.0 | 7289.0 | 35 | 46 | 10, 10, 6, 10, 10, 0, |
| 1 | 1.8 | 7.0 | 3033.0 | 35 | 49 | 12, 12, 1, 12, 12, 0, |
| 1 | 1.8 | 24.0 | 789.0 | 35 | 67 | 0, 31, 0, 5, 31, 0, |
| 2 | 1.0 | 4.0 | Infeasible | | | |

The first feasible distribution plan 102 that was found in the results summarized in Table 6 had a minimized cost objective of 15,231.00 USD. According to the distribution plan 102, is possible to distribute customer Cis backup data across the data centres 106 with a minimum cumulative storage cost of 15,231.00 USD, with an RPO bound of 1 hours and an RTO bound of 4.6 hours, with a protection level of 1. Also according to the distribution plan 102, the backup data 104 is to be distributed as follows:

DC1_Z1: 8 coded fragments=80 GB
DC1_Z2: 8 coded fragments=80 GB
DC2_Z1: 8 coded fragments=80 GB
DC2_Z2: 8 coded fragments=80 GB
DC3_Z1: 8 coded fragments=80 GB
DC3_Z2: 7 coded fragments=70 GB A total of 470 GB of storage is used to store 350 GB of backup data of customer C1. Accordingly, the erasure coding rate selected by the data placement planner 108 is m/n, which equals 35/47 in the first feasible distribution plan 102.

The data placement planner 108 indicated that certain RPO and RTO values were infeasible given the particulars of the hypothetical. For example, there is no distribution plan 102 that distributes Cis backup data 104 such that an RPO bound of 1 hr and an RTO bound of 4 hrs can be satisfied.

Table 7 below describes scenarios where C1+s RPO was minimized while continuing to satisfy the specified RTO and cost bounds.

TABLE 7

| Redundancy Level | Minimized RPO (Hours) | RTO Bound (Hours) | Cost Bound (Dollars) | m | n | DataCentre/Zone Shares (DC1_Z1, DC1_Z2 DC2_Z1, DC2_Z2, DC3_Z1, DC3_Z2) Fragments |
|---|---|---|---|---|---|---|
| 1 | Infeasible | 6.0 | 1950.0 | Infeasible | | |
| 1 | Infeasible | 7.0 | 1950.0 | Infeasible | | |
| 1 | 0.8628334 | 24.0 | 1950.0 | 35 | 51 | 9, 14, 0, 14, 14, 0, |
| 2 | Infeasible | 4.0 | 1950.0 | Infeasible | | |
| 1 | Infeasible | 7.0 | 2000.0 | Infeasible | | |
| 1 | 0.82172227 | 24.0 | 2000.0 | 35 | 50 | 11, 13, 0, 13, 13, 0, |
| 2 | Infeasible | 4.0 | 2000.0 | Infeasible | | |
| 2 | Infeasible | 4.3 | 2000.0 | Infeasible | | |
| 1 | Infeasible | 7.0 | 2400.0 | Infeasible | | |
| 1 | 0.7147778 | 24.0 | 2400.0 | 35 | 50 | 14, 11, 0, 14, 11, 0, |
| 2 | Infeasible | 4.0 | 2400.0 | Infeasible | | |
| 1 | Infeasible | 6.0 | 2800.0 | Infeasible | | |
| 1 | 0.75922227 | 7.0 | 2800.0 | 35 | 49 | 12, 12, 1, 12, 12, 0, |
| 1 | 0.66477776 | 24.0 | 2800.0 | 35 | 53 | 16, 10, 0, 16, 10, 1, |
| 2 | Infeasible | 4.0 | 2800.0 | Infeasible | | |

Table 8 below describes scenarios where C1's RTO was minimized while continuing to satisfy the specified RPO and cost bounds.

TABLE 8

| Redundancy Level | RPO Bound (Hours) | Minimized RTO (Hours) | Cost Bound(Dollars) | m | n | DataCentre/Zone Shares (DC1_Z1, DC1_Z2, DC2_Z1, DC2_Z2, DC3_Z1, DC3_Z2) Fragments |
|---|---|---|---|---|---|---|
| 1 | 1.0 | 8.503056 | 1950.0 | 35 | 51 | 9, 14, 0, 14, 14, 0, |
| 1 | 1.2 | 8.503056 | 1950.0 | 35 | 51 | 9, 14, 0, 14, 14, 0, |
| 1 | 1.4 | 8.503056 | 1950.0 | 35 | 51 | 9, 14, 0, 14, 14, 0, |
| 1 | 1.8 | 8.503056 | 1950.0 | 35 | 51 | 14, 14, 0, 9, 14, 0, |
| 2 | 1.0 | Infeasible | 1950.0 | Infeasible | | |
| 2 | 1.2 | Infeasible | 1950.0 | Infeasible | | |
| 3 | 1.8 | Infeasible | 1950.0 | Infeasible | | |
| 1 | 1.0 | 8.094167 | 2000.0 | 35 | 50 | 11, 13, 0, 13, 13, 0, |
| 1 | 1.2 | 8.094167 | 2000.0 | 35 | 50 | 11, 13, 0, 13, 13, 0, |
| 1 | 1.4 | 8.094167 | 2000.0 | 35 | 50 | 11, 13, 0, 13, 13, 0, |
| 1 | 1.8 | 8.094167 | 2000.0 | 35 | 50 | 13, 13, 0, 11, 13, 0, |
| 2 | 1.0 | Infeasible | 2000.0 | Infeasible | | |

2.3 Example Results—Multiple Customers

Results for multiple distribution plans 102 for the five hypothetical customers listed in Table 3 were generated. Various deadlines (RPOs and RTOs) for customers were selected, and the quanta 230 corresponding to the selected RPO and RTO for each of the customers are listed below in Table 9.

TABLE 9

| Customer | RPODeadLineTimeQuanta | RTODeadLineTimeQuanta |
|---|---|---|
| C4 | 4 | 11 |
| C3 | 6 | 10 |
| C5 | 4 | 7 |
| C2 | 6 | 9 |
| C1 | 5 | 9 |

Table 10 below lists two scenarios tested, where storage costs were minimized. In Table 10, the RPO Time Quanta refers to the number of quanta in the complete time window 210 for RPO, and RPOTimeQuantaLength refers to the duration of each quantum 240 in the complete time window 210 for RPO. Similarly, RTO Time Quanta refers to the number of quanta in the complete time window 210 for RTO, and RTO-TimeQuantaLength refers to the duration of each quantum 240 in the complete time window 210 for RTO. Although no distribution plan 102 is feasible given the particulars of the hypothetical in the first scenario, Table 11 describes the distribution plan 102 that minimizes storage cost in the second scenario. Although optimizing for network usage cost is possible, the results given below are optimized for storage cost alone.

TABLE 10

| Scenarios Number | RPO Time Quanta | RPOTime Quanta Length (Hours) | RTO Time Quantas | RTOTime Quanta Length (Hours) | Result |
|---|---|---|---|---|---|
| 1 | 7 | 0.5 | 11 | 3 | Infeasible |
| 2 | 7 | 0.5 | 11 | 7 | Refer to Table 11 Below |

TABLE 11

| Customer | DataCentre&Zone | Fragments |
|---|---|---|
| C4 | DC2_Z1 | 22 |
| C4 | DC2_Z2 | 22 |
| C4 | DC1_Z1 | 22 |
| C4 | DC3_Z2 | 22 |
| C4 | DC1_Z2 | 22 |
| C4 | DC3_Z1 | 22 |
| C3 | DC2_Z1 | 16 |
| C3 | DC2_Z2 | 18 |
| C3 | DC1_Z1 | 18 |
| C3 | DC3_Z2 | 1 |
| C3 | DC1_Z2 | 12 |
| C3 | DC3_Z1 | 12 |
| C5 | DC2_Z1 | 26 |
| C5 | DC2_Z2 | 25 |
| C5 | DC1_Z1 | 25 |
| C5 | DC3_Z2 | 25 |
| C5 | DC1_Z2 | 0 |
| C5 | DC3_Z1 | 0 |
| C2 | DC2_Z1 | 12 |
| C2 | DC2_Z2 | 12 |
| C2 | DC1_Z1 | 12 |
| C2 | DC3_Z2 | 12 |
| C2 | DC1_Z2 | 12 |
| C2 | DC3_Z1 | 12 |
| C1 | DC2_Z1 | 9 |
| C1 | DC2_Z2 | 9 |
| C1 | DC1_Z1 | 9 |
| C1 | DC3_Z2 | 9 |
| C1 | DC1_Z2 | 9 |
| C1 | DC3_Z1 | 9 |

Figure 3:
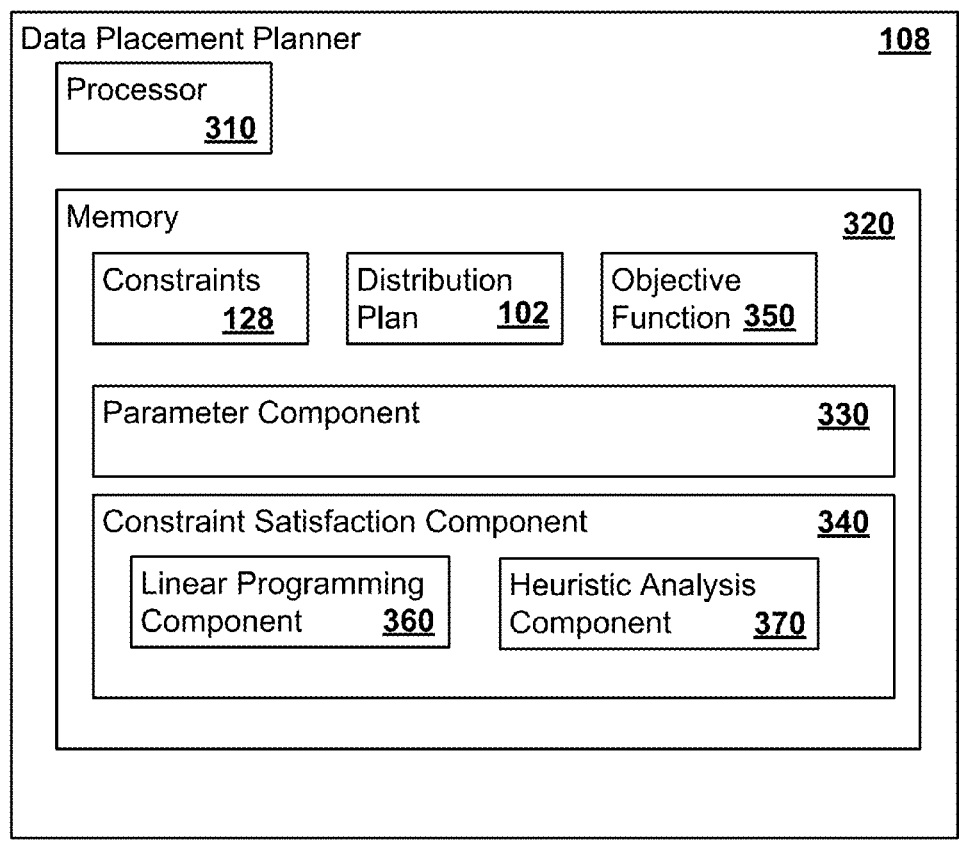
FIG. 3 illustrates an example of a data placement planner that generates a distribution plan.

FIG. 3 illustrates an example of the data placement planner 108 that implements the system 100 for generating a distribution plan 102 for distribution of backup data 104 across data centres 106. The data placement planner 108 may include a processor 310 and a memory 320. The data placement planner 108 may include additional, fewer, or different components. For example, the data placement planner 108 may include a display device and an input device. Alternatively, the data placement planner may include software only and no hardware.

The memory 320 may hold the programs and processes that implement the logic described above for execution by the processor 310. As examples, the memory 320 may hold a parameter component 330, and a constraint satisfaction component 340 that together implement the logic of the data placement planner 108 described herein. Alternatively or in addition, the memory 320 may include data structures or data, such the constraints 128, the distribution plan 102, and one or more objective functions 350.

The parameter component 330 may include logic that receives input data, such as Service Level Agreements (SLAs), infrastructure information, parameters, customer information, or any combination of data types. The parameter component 330 may receive the input data from files, devices, user input, user interfaces, or any other input source.

The constraint satisfaction component 340 may include the logic that implements the constraint satisfaction mechanism. For example, the constraint satisfaction component 340 may include logic that determines a solution to one or more mathematical objective functions 350, where the solution satisfies constraints, such as the constraints 128 on the distribution plan 102. The constraint satisfaction component 340 may include a linear programming component 360 that includes a linear programming solver. The solver may formulate the input parameters, criteria, and variables into a linear programming (LP) model and fits those to a set of the objective functions 350 and the constraints 128. The solver may use Erasure Coding (ER) or some other encoding scheme. Alternatively or in addition, the constraint satisfaction component 340 may include a heuristic analysis component 370 that may determine a solution to the mathematical objective functions 350, where the solution satisfies the constraints 128.

In one embodiment, the data placement planner 108 may be implemented as a standalone software tool. The data placement planner 108 may accept business SLAs through an input file as a set of values, bounds and parameters. The data placement planner 108 may output a set of feasible solutions (if any) for data placement in the form of the distribution plan 102.

The data placement planner 108 may be implemented in many different ways. For example, although some features are shown stored in computer-readable memories (e.g., as logic implemented as computer-executable instructions or as data structures in memory), all or part of data placement planner 108 and its logic and data structures may be stored on, distributed across, or read from other machine-readable media. The machine-readable media may include hard disks, floppy disks, CD-ROMs, or any other storage device, including memories such as flash memory and random access memory (RAM).

The processor 310 may be implemented as a general processor, a central processing unit, a server device, an application specific integrated circuit (ASIC), a digital signal processor, a field programmable gate array (FPGA), a digital circuit, an analog circuit, a microcontroller, any other type of processor, or any combination thereof. The memory 320 may be a non-volatile and/or volatile memory, such as a random access memory (RAM), a read-only memory (ROM), an erasable programmable read-only memory (EPROM), flash memory, any other type of memory now known or later discovered, or any combination thereof. The memory 320 may include an optical, magnetic (hard-drive) or any other form of data storage device.

The processor 310 may be in communication with the memory 310. In one example, the processor 310 may also be in communication with additional elements, such as a display and one or more user input devices, like a mouse, and a keyboard.

The processing capability of the system 100, the data placement planner 108, or both may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that implements the constraint satisfaction component 340. As another example, the DLL may itself provide all or some of the functionality of the system, tool, or both.

Figure 4:
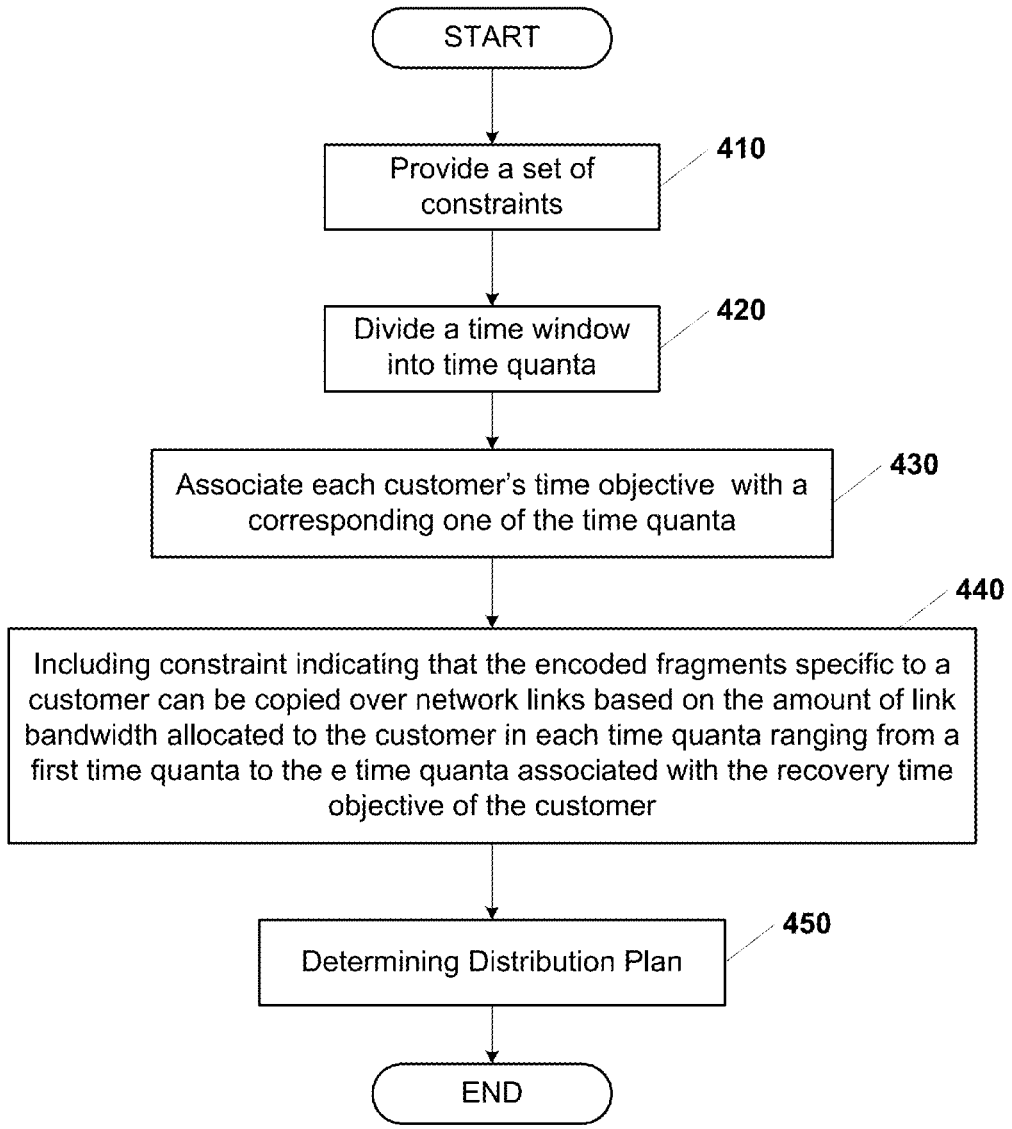
FIG. 4 illustrates an example flow diagram of the logic of the system for generating a distribution plan for multiple customers.

FIG. 4 illustrates an example flow diagram of the logic of the system 100. The logic may include additional, different, or fewer operations. For example, the logic may include operations (410) and (450) in which a set of constraints 128 are provided and the distribution plan 102 is determined, without the other operations illustrated in FIG. 4. The operations may be executed in a different order than illustrated in FIG. 4.

The operations may begin with an operation (410) in which a set of constraints 128 are provided. The set constraints 128 may be for a single customer or for multiple customers. In one example, the set of constraints 128 may include multiple time objectives (such as RTO or RPO), where each of the time objectives is for a corresponding one of multiple customers.

The operations may continue with an operation (420) in which the time window 210 is divided into the time quanta 230. In addition, the operations may include an operation (430) in which each of the time objectives is associated with a corresponding one of the time quanta 320 in which the respective time objective falls.

The operations may include an operation (440) in which a recovery deadline constraint is included in the constraints 128 that indicates a portion of the network bandwidth of at least one of the links 127 between the data centres 106 and the recovery data centre 112 is allocated to at least one of the customers in each of the time quanta 230. The included recovery deadline constraint may also indicate that the encoded fragments of the backup data 205 that are specific to a respective one of the customers can be copied from the data centres to the recovery data centre 112 over the links 127 based on network bandwidth allocated to the respective customer in each of the time quanta 230 ranging from a first time quantum 240 to the corresponding one of the time quantum associated with the time objective of the respective customer.

The operations may include an operation (450) in which the distribution plan 102 is determined. The operations may end, for example, by writing the distribution plan 102 to a storage device and/or displaying the distribution plan 102 on a display screen.

In one example, the system 100 may be a system to distribute data across a network of devices. The system 100 may include the data centres 106 in the network 126, the parameter component 330, the constraint satisfaction component 340, and the backup component 118. The system 100 may include additional, fewer, or different components.

The parameter component 330 may be configured to receive a protection level parameter indicative of the number of the data centres 106 that may fail and still be able to recover the backup data 104 from encoded fragments of the backup data 104 stored in the data centres 106 that did not fail. The constraint satisfaction component 340 may be configured to generate the distribution plan 102 that satisfies a set of the constraints 128 including the protection level parameter, the distribution plan comprising the number of the encoded fragments to distribute to each respective one of the data centres 106. The backup component 118 may be configured to distribute the backup data 104 across the data centres 106 in accordance with the distribution plan 102.

One interesting feature may be that a protection level constraint in the set of constraints 128 may be modeled as an equation in which a total number of fragments of the backup data 104 to be encoded is less than or equal to a sum of a series comprising the number of the encoded fragments to distribute to each respective one of the data centres 106 that is in a subset O of the data centres 106, for every subset O of the data centres 106 that includes n-k of the data centers 106, where n is a total number of the data centres 106 and k is the number of the data centres 106 that may fail as indicated by the protection level parameter. Alternatively or in addition, a recovery time constraint in the set of constraints may be modeled as an equation that indicates the number of the encoded fragments to distribute to each respective one of the data centres 106 multiplied by the size of an encoded fragment is less than or equal to a bandwidth available on a respective one of the data links 127, which may extend from the data centres 106 to the recovery data centre 112, for a time period indicated by the recovery time objective (RTO). Alternatively or in addition, a backup time constraint in the set of constraints may be modeled as an equation that indicates the number of the encoded fragments to distribute to each respective one of the data centres 106 multiplied by the size of an encoded fragment is less than or equal to bandwidth available on a respective one of the data links 127, which may extend from the source data centre 110 to the data centres 106, for a time period indicated by the recovery point objective (RPO).

Another interesting feature may be that the constraint satisfaction component 340 may comprise the linear programming component 360 configured to determine the distribution plan 102 in which an objective function falls on or below a threshold value and the set of constraints 128 is satisfied. In one example, the objective function may include an objective function for cost that indicates a sum, over each respective one of the data centres that stores coded fragments of the backup data, of the multiplicative product of the size of an encoded fragment, the number of the encoded fragments to distribute to the respective one of the data centres, and the cost of storage per unit of data in the respective one of the data centres. For example, the cost function may be the following:

$$\sum_{i=1}^{n} (F_{Cust}/m_e) * c_i * X_i$$

As a result, the backup data 104 may be distributed across the data centres 106 at the lowest cost while still satisfying the constraints 128, such as the protection level indicated by the protection level parameter.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or nonvolatile memory such as ROM and RAM, or any other suitable storage device. Moreover, the various components' functionality is but one example of such functionality and any other configurations encompassing similar functionality are possible.

Furthermore, although specific components of innovations were described, methods, systems, and articles of manufacture consistent with the innovation may include additional or different components. For example, any of the components, such as the data placement planner, 108, the parameter component 330, the constraint satisfaction component 340, the linear programming component 360, the heuristic analysis component 370, the backup component 118, and the processor 310, may be implemented as discrete logic, a microprocessor, a microcontroller, an application specific integrated circuit (ASIC), a field programmable gate array (FPGA), or a combination of any type of circuit or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or device. The components may be resident on separate hardware, such as separate removable circuit boards or computers, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the disclosure have been described, it will be apparent to those of ordinary skill in the art that many more embodiments and implementations are possible within the scope of the disclosure. Accordingly, the innovation is not to be restricted except in light of the attached claims and their equivalents.

We claim:

1. A system to distribute data across a network, the system comprising:
   a plurality of storage units, wherein each of the storage units is included in a corresponding one of a plurality of data centres interconnected via the network;

a memory comprising:
a parameter component configured to receive a protection level parameter indicative of a number of the data centres that can fail and backup data remains recoverable from encoded fragments stored in the storage units of the data centres that did not fail, wherein the backup data is encoded into the encoded fragments, and a set of the encoded fragments is for each respective one of a plurality of customers;
a constraint satisfaction component configured to generate a distribution plan that satisfies a set of constraints that includes the protection level parameter and a plurality of recovery point objectives for the customers, wherein each of the recovery point objectives is for a corresponding one of the customers, the distribution plan comprises a number of the encoded fragments to distribute to each respective one of the data centres, and each of the recovery point objectives indicates an amount of time within which an incremental backup is completed for the corresponding one of the customers; and
a backup component configured to distribute the encoded fragments across the data centres according to the distribution plan, wherein the constraint satisfaction component is further configured to:
select a time window that is at least as long as the longest of the recovery point objectives of the plurality of customers;
divide the time window into time quanta, each one of the time quanta representing a time slot in the time window; and
associate each of the recovery point objectives with a corresponding one of the time quanta in which a respective one of the recovery point objectives falls.

2. The system of claim 1, wherein the constraint satisfaction component is further configured to include a recovery deadline constraint for the customers in the set of constraints, the recovery deadline constraint indicating that a portion of a bandwidth of at least one of a plurality of links between the data centres and a recovery data centre is allocated to at least one of the customers in each of the time quanta.

3. The system of claim 2, wherein the recovery deadline constraint further indicates that the encoded fragments of the backup data that are for a respective one of the customers are transferable from the data centres to the recovery data centre over the links based on link bandwidth allocated to the respective one of the customers in each time quanta from a first time quanta to the corresponding one of the time quanta associated with the respective one of the recovery point objectives of the respective one of the customers.

4. The system of claim 1, wherein the constraint satisfaction component comprises a linear programming component configured to determine the distribution plan in which an objective function evaluates to a value that is on or below a threshold value and the set of constraints is satisfied.

5. The system of claim 4, wherein the objective function represents the recovery point objectives.

6. The system of claim 4, wherein the objective function represents a storage cost for the distribution plan.

7. A computer-implemented method to generate a plan for distribution of data over a network, the method comprising:
providing a set of constraints on a distribution plan, the distribution plan for storage of backup data, the set of constraints including a protection level that indicates if a particular number of a plurality of data centres fail, then the backup data is recoverable from encoded fragments stored on the data centres that did not fail, wherein the backup data is encoded into the encoded fragments, and a set of the encoded fragments is for each respective one of a plurality of customers;
including a plurality of recovery point objectives in the set of constraints with a processor, each of the recovery point objectives indicating an amount of data loss that is acceptable to a corresponding one of the customers by indicating an amount of time within which an incremental backup is completed for the corresponding one of the customers; and
determining, with the processor, a number of the encoded fragments to distribute to each respective one of the data centres such that the set of constraints, which includes the protection level and the recovery point objectives for the plurality of customers, is satisfied, the distribution plan comprising the number of the encoded fragments to distribute to each respective one of the data centres, wherein determining the number of the encoded fragments to distribute comprises:
selecting a time window that is as least as long as the longest of the recovery point objectives of the plurality of customers;
dividing the time window into time quanta, each one of the time quanta representing a time slot in the time window; and
associating each of the recovery point objectives with a corresponding one of the time quanta in which a respective one of the recovery point objectives falls.

8. The method of claim 7 further comprising including a recovery deadline constraint for the customers in the set of constraints, the recovery deadline constraint indicating that a portion of a bandwidth of at least one of a plurality of links in the network is allocated to at least one of the customers in each of the time quanta.

9. The method of claim 7, wherein the protection level includes a plurality of protection levels, the method further comprising:
including the plurality of protection levels in the set of constraints with the processor, each one of the protection levels indicating a degree to which a corresponding one of the customers accepts simultaneous failures of the data centres; and
determining, with the processor, a number of fragments in the set of the encoded fragments for each respective one of the customers to store in each respective one of the data centres such that the set of constraints including the protection levels is satisfied.

10. The method of claim 9 further comprising determining with the processor a total number of the encoded fragments in each set of the encoded fragments to generate from each set of input fragments that is for a respective one of the customers.

11. The method of claim 7, wherein determining the number of the encoded fragments to distribute comprises maximizing or minimizing an objective function while satisfying the constraints through application of linear programming by the processor.

12. The method of claim 7, wherein determining the number of the encoded fragments to distribute comprises maximizing or minimizing an objective function while satisfying the constraints through application of heuristic analysis by the processor.

13. A tangible non-transitory computer-readable medium encoded with computer executable instructions for generating a plan to distribute data across a network, the computer executable instructions executable with a processor, the computer-readable medium comprising:

instructions executable to receive a protection level parameter that indicates a number of a plurality of data centres that are to remain available after a failure of one or more of the data centres such that backup data is recoverable from encoded fragments stored in the data centres that remain available after the failure of the one or more of the data centres, the backup data encoded into the encoded fragments, the encoded fragments including a set of the encoded fragments for each respective one of a plurality of customers; and instructions executable to determine how many of the encoded fragments to distribute to each respective one of the data centres such that a set of constraints is satisfied based on associations between the recovery point objectives and time quanta of a time window that is as least as long as the longest of the recovery point objectives, the set of constraints including a constraint that if the number of the data centres indicated in the protection level parameter remain available after a failure, then the backup data is recoverable from the encoded fragments that are stored in the data centres that remain available after the failure, the set of constraints further including a plurality of recovery point objectives, each of the recovery point objectives indicative of an amount of time within which an incremental backup is completed for a corresponding one of the customers.

14. The computer-readable medium of claim 13, wherein the backup data comprises k input fragments that are encoded into n encoded fragments, the k input fragments recoverable from any k of the encoded fragments, and k is less than n.

15. The computer-readable medium of claim 13, further comprising instructions executable to formulate the set of constraints into a linear programming model and to minimize an objective function in the determination of how many of the encoded fragments to distribute to each respective one of the data centres.

16. The computer-readable medium of claim 15, wherein the objective function is a model of storage costs.

17. The computer-readable medium of claim 15, wherein the objective function is a model of storage costs and network costs.

18. A computer-implemented method to generate a plan for distribution of data over a network, the method comprising:

providing a set of constraints on a distribution plan, the distribution plan for storage of backup data, the set of constraints including a protection level that indicates if a particular number of a plurality of data centres fail, then the backup data is recoverable from encoded fragments stored on the data centres that did not fail, wherein the backup data is encoded into the encoded fragments, and a set of the encoded fragments is for each respective one of a plurality of customers;

including a plurality of recovery point objectives in the set of constraints with a processor, each of the recovery point objectives indicating an amount of data loss that is acceptable to a corresponding one of the customers by indicating an amount of time within which an incremental backup is completed for the corresponding one of the customers; and determining, with the processor, a number of the encoded fragments to distribute to each respective one of the data centres such that the set of constraints, which includes the protection level and the recovery point objectives for the plurality of customers, is satisfied, the distribution plan comprising the number of the encoded fragments to distribute to each respective one of the data centres, wherein determining the number of the encoded fragments to distribute comprises:

determining k and n such that the backup data is divided into k input fragments that are encoded into n encoded fragments, the k input fragments recoverable from any k of the encoded fragments, and k is less than n; and a backup component configured to distribute the encoded fragments across the data centres according to the distribution plan.

19. A tangible non-transitory computer-readable medium encoded with computer executable instructions for generating a plan to distribute data across a network, the computer executable instructions executable with a processor, the computer-readable medium comprising:

instructions executable to receive a protection level parameter that indicates a number of a plurality of data centres that are to remain available after a failure of one or more of the data centres such that backup data is recoverable from encoded fragments stored in the data centres that remain available after the failure of the one or more of the data centres, the backup data encoded into the encoded fragments, the encoded fragments including a set of the encoded fragments for each respective one of a plurality of customers; and instructions executable to determine how many of the encoded fragments to distribute to each respective one of the data centres such that a set of constraints is satisfied based on formulation of the set of constraints into a linear programming model and minimization of an objective function, the set of constraints including a constraint that if the number of the data centres indicated in the protection level parameter remain available after a failure, then the backup data is recoverable from the encoded fragments that are stored in the data centres that remain available after the failure, the set of constraints further including a plurality of recovery point objectives, each of the recovery point objectives indicative of an amount of time within which an incremental backup is completed for a corresponding one of the customers.

* * * * *